(12) United States Patent
Ancona et al.

(10) Patent No.: US 6,707,009 B1
(45) Date of Patent: Mar. 16, 2004

(54) COMBINED TOASTER/BREADBOX

(75) Inventors: Bruce Ancona, New York, NY (US); Robert A. Varakian, Edgewater, NJ (US)

(73) Assignee: Salton, Inc., Lake Forest, IL (US)

( * ) Notice: Subject to any disclaimer, the term of this patent is extended or adjusted under 35 U.S.C. 154(b) by 0 days.

(21) Appl. No.: 10/099,527

(22) Filed: Mar. 15, 2002

(51) Int. Cl.$^7$ ............................. A47J 37/08; A47J 47/12
(52) U.S. Cl. ........................... 219/386; 99/327; 99/357
(58) Field of Search ............................... 219/386, 385, 219/400; 99/327, 332, 357, 484, 201, 214, 218

(56) References Cited

U.S. PATENT DOCUMENTS

| | | | | |
|---|---|---|---|---|
| 1,529,342 A | * | 3/1925 | Christy | ................ 99/327 |
| 3,692,975 A | * | 9/1972 | Markus et al. | ................ 99/357 |
| 6,205,911 B1 | * | 3/2001 | Ochoa | ................ 99/331 |
| 6,543,338 B2 | * | 4/2003 | Chasen et al. | ................ 99/357 |

* cited by examiner

Primary Examiner—Joseph Pelham
(74) Attorney, Agent, or Firm—Sonnenschein Nath & Rosenthal LLP

(57) ABSTRACT

A combination toaster and breadbox includes an enclosure, a toaster having a heating area disposed within the enclosure, and a breadbox having a storage area also disposed within the enclosure. The combination may include a fan installed within a gap disposed between the toaster and breadbox within the enclosure that draws in cool air so as to prevent the transfer of heat from the toaster to the breadbox. The toaster may comprise a toaster oven.

31 Claims, 24 Drawing Sheets

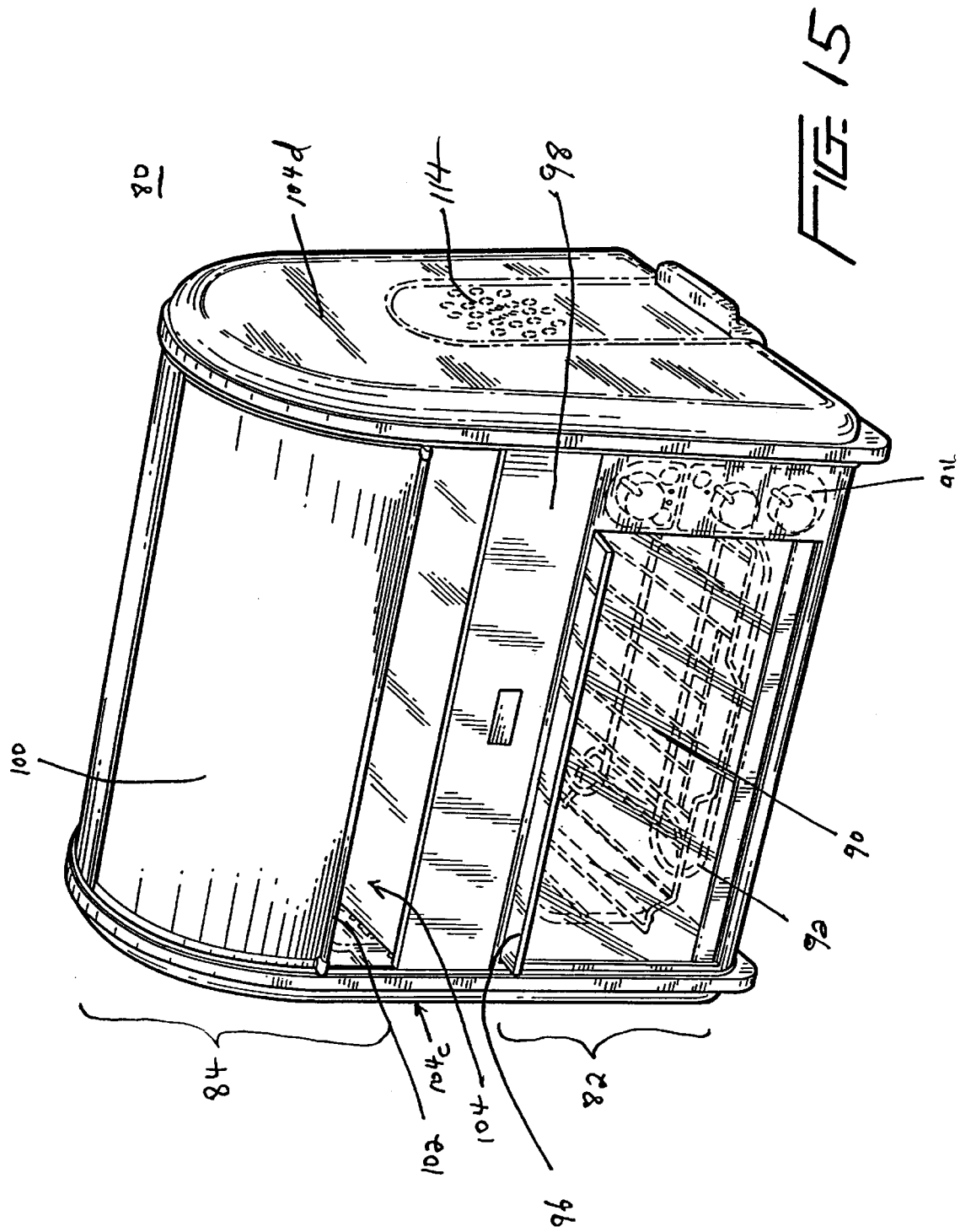

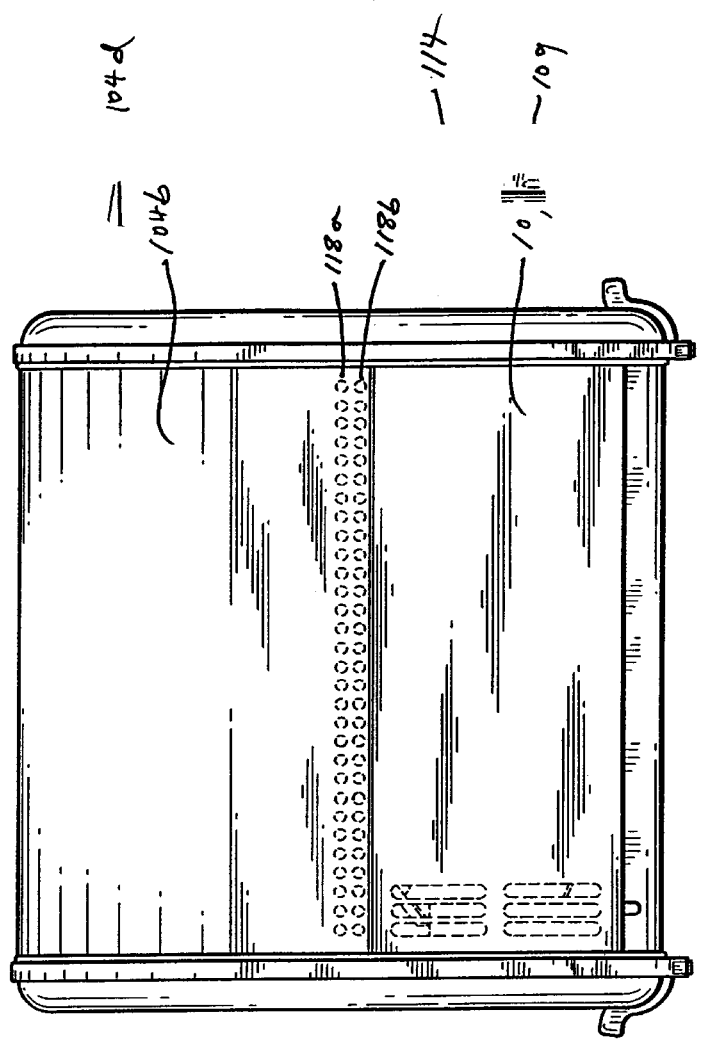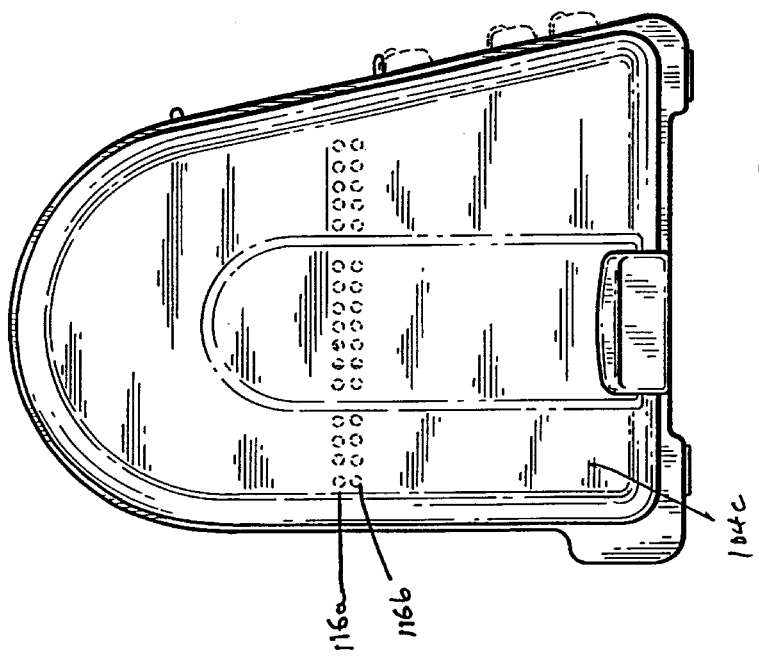

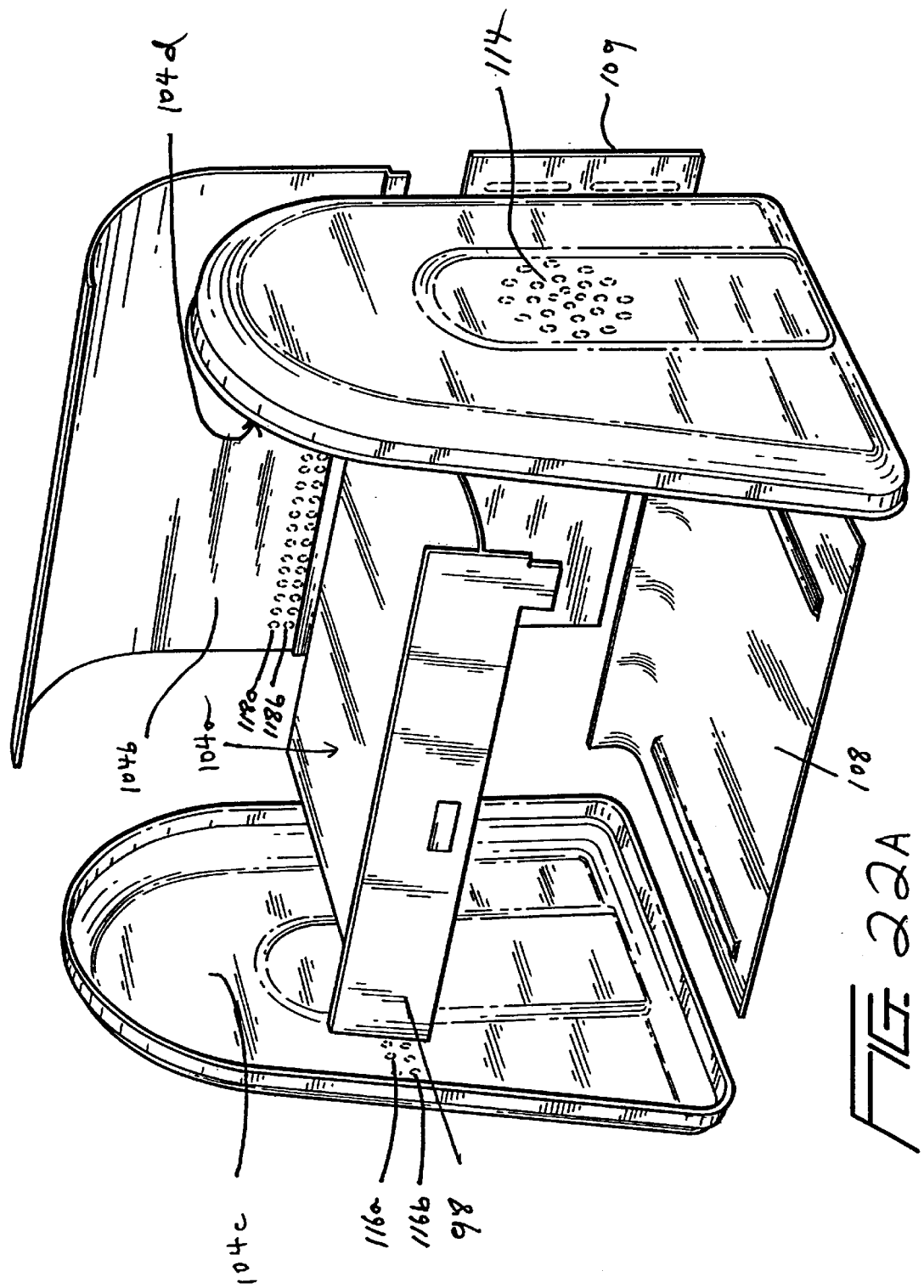

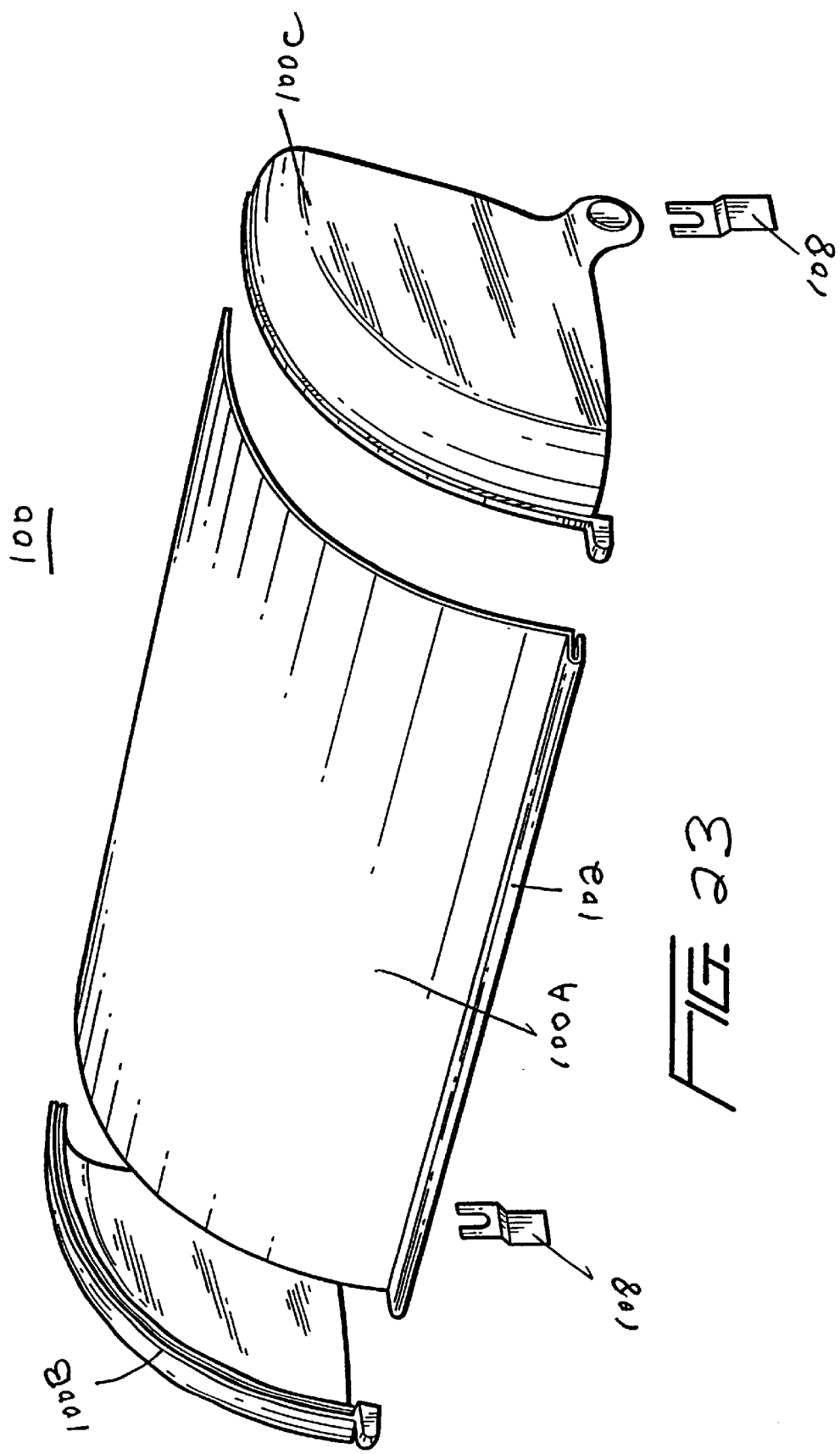

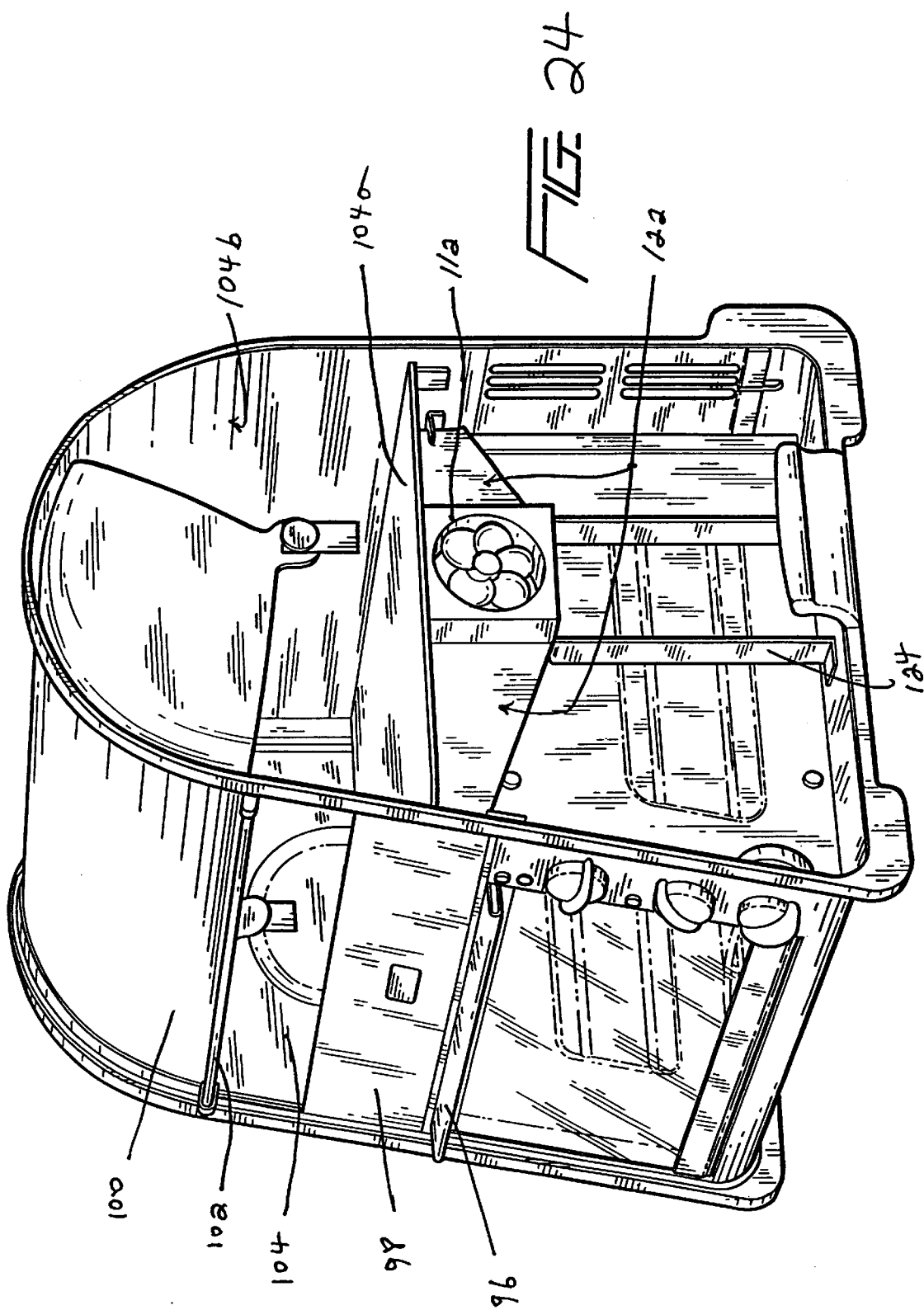

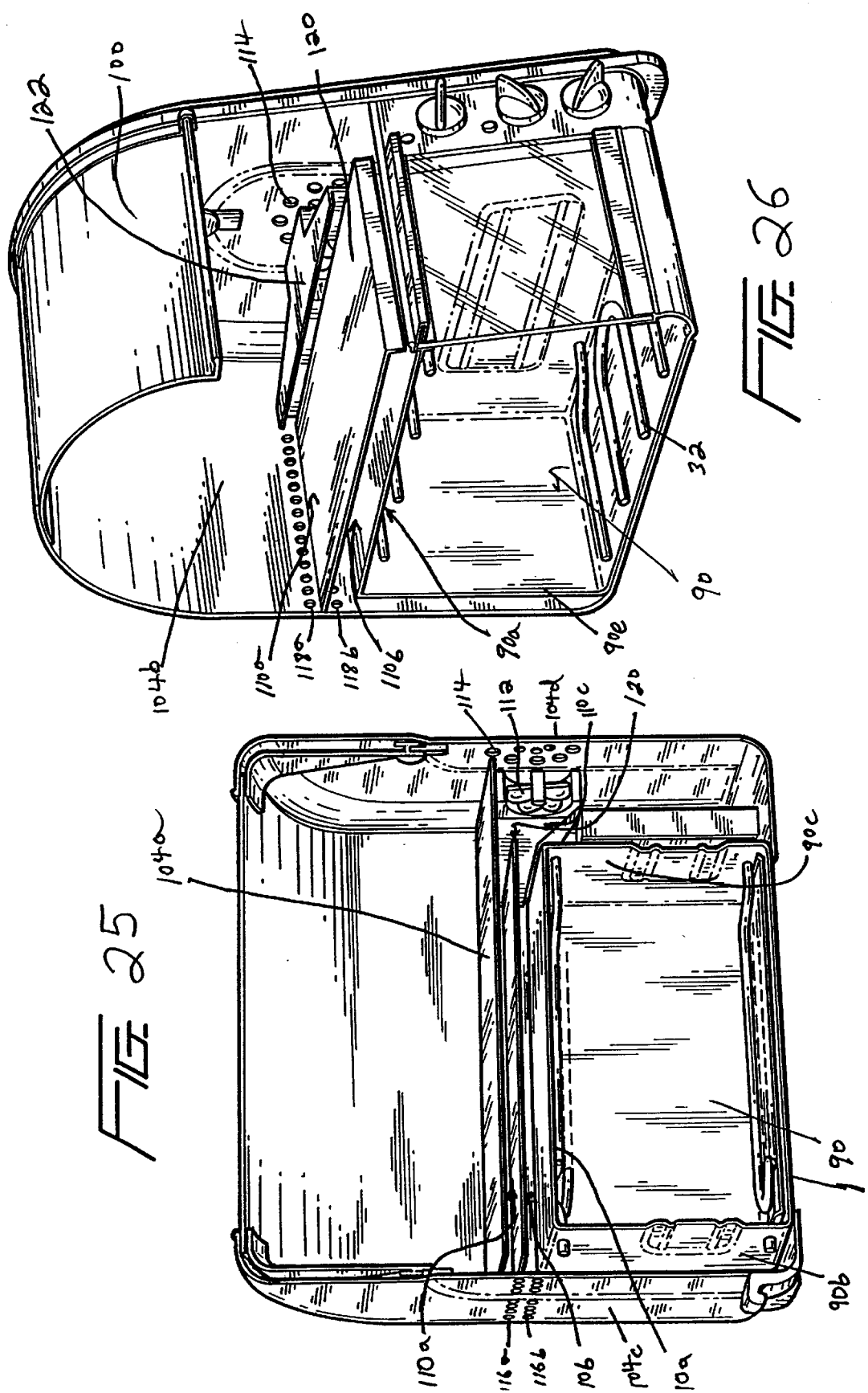

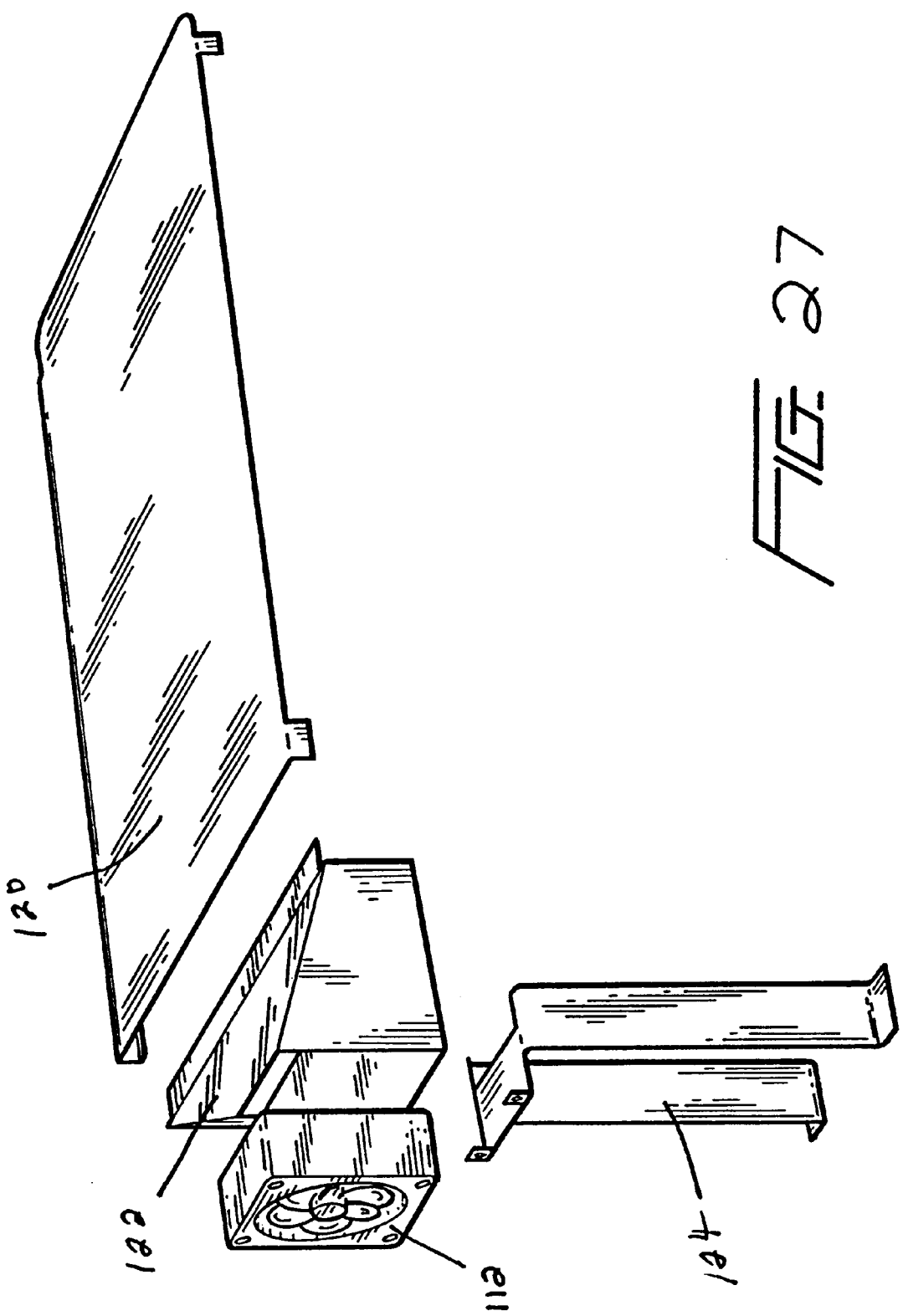

COMBINED TOASTER/BREADBOX

FIELD OF THE INVENTION

The present invention relates generally to kitchen appliances and, more particularly, to a combination toaster/breadbox designed to operate as both a toaster and also as a breadbox within a single enclosure. The present invention also relates to a combined toaster oven/breadbox.

BACKGROUND OF THE INVENTION

Toasters and toaster ovens are well known and have commonly been utilized for many decades. Similarly, breadboxes, i.e., boxes for storing bread, bagels, etc., have been in use for over a century now. Toasters, toaster ovens and breadboxes come in numerous shapes and sizes and are seen in one form or another in countless homes throughout the world.

Interestingly, breadboxes and toasters, as well as toaster ovens, relate to the same types of food products, namely, bread, bagels and the like. However, these kitchen-type items generally are considered to be unrelated to one another.

OBJECTS OF THE INVENTION

It is therefore an object of the present invention to provide a combined toaster breadbox that provides both a toaster and a breadbox within a single enclosure.

It is a further object of the present invention to provide a combined toaster breadbox that utilizes less space then required by current devices.

It is another object of the present invention to provide a combined toaster breadbox that advantageously maintains the interior of the breadbox storage area at a temperature that is not effected by the heat produced by the toaster section of the combined device.

It is a further object of the present invention to provide a combined toaster oven breadbox with advantages similar to that of the combined toaster/breadbox of the present invention.

Various other objects, advantages and features of the present invention will become readily apparent to those of ordinary skill in the art, and the novel features will be particularly pointed out in the appended claims.

SUMMARY OF THE INVENTION

In accordance with the present invention, a combination toaster and breadbox includes an enclosure, a toaster having a heating area disposed within the enclosure, and a breadbox having a storage area disposed within the enclosure.

As an aspect of the present invention, the toaster is disposed adjacent to the rear panel of the enclosure, and the breadbox is disposed adjacent to the front panel of the enclosure, and the breadbox includes a door that is disposed within the front panel.

As another aspect of the invention, the enclosure includes a gap between the breadbox and the toaster, and the gap extends fully between the two side panels of the enclosure.

As a further aspect of the invention, a fan is disposed within the gap and the fan draws in cool air from the exterior into the gap.

As a feature of this aspect, each side panel includes venting slots that allow air to flow into and out from the gap.

As another feature of the invention, the gap includes a relatively narrow portion that extends from one side to near the other side, and a relatively wide portion that is disposed adjacent to that other side, and the fan is disposed within the relatively wide portion of the gap.

As a further feature, the gap extends from the enclosure's top to its bottom along the length of the gap that extends between the two side panels.

As yet another feature, the combination includes a removable tray disposed at the bottom of the enclosure and below both the toaster and the breadbox, and the tray captures items that fall from within both the toaster and the breadbox.

As a feature of this feature, the tray includes a slot that is disposed below the gap so as to allow air to pass through the tray.

In accordance with another embodiment of the present invention, a combination toaster oven and breadbox includes an enclosure, a toaster oven disposed within the enclosure and a breadbox having a storage area also disposed within the enclosure.

As an aspect of this embodiment, the breadbox is disposed above the toaster oven within the enclosure, and the enclosure includes a gap disposed between the toaster oven and breadbox to reduce the transfer of heat between the toaster oven and the breadbox.

As another aspect of the invention, the combination toaster oven and breadbox includes a fan disposed within the gap that draws in cool air from the exterior into the gap.

As a further aspect of the invention, a divider panel is disposed between the breadbox and the toaster oven, and spaces are disposed between the divider panel and the toaster oven, and between the divider panel and the breadbox to define first and second gaps, respectively.

As a feature of this aspect, the divider panel extends from one side of the enclosure to a position disposed away from the other side of the enclosure, and the fan is disposed between the divider panel and that other side, and the fan draws in cool air into both the first and second gaps.

BRIEF DESCRIPTION OF THE DRAWINGS

The following detail description, given by way of example and not intended to limit the present invention solely thereto, will be best be appreciated in conjunction with the accompanying drawings, wherein like reference numerals denote like elements and parts, in which:

FIG. 15 is a front, perspective view of a combined toaster oven breadbox in accordance with another embodiment of the present invention;

FIG. 18 is a left side view of the combined toaster oven breadbox of the present invention;

FIG. 19 is a rear view of the combined toaster oven breadbox of the present invention;

FIG. 22A is an exploded, perspective view of various components of the enclosure of the combined toaster oven breadbox of the present invention;

FIG. 23 is an exploded, perspective view of the bread box door of the combined toaster oven breadbox of the present invention;

FIG. 24 is a perspective, partially in phantom, side view of the combined toaster oven breadbox of the present invention;

FIG. 25 is another front, partially broken view of the combined toaster oven breadbox of the present invention;

FIG. 26 is another front perspective, partially broken view of the combined toaster oven breadbox of the present invention; and FIG. 27 is a perspective view of the fan and associated components of the combined toaster oven breadbox of the present invention.

DETAILED DESCRIPTION OF THE INVENTION

Figure 1:
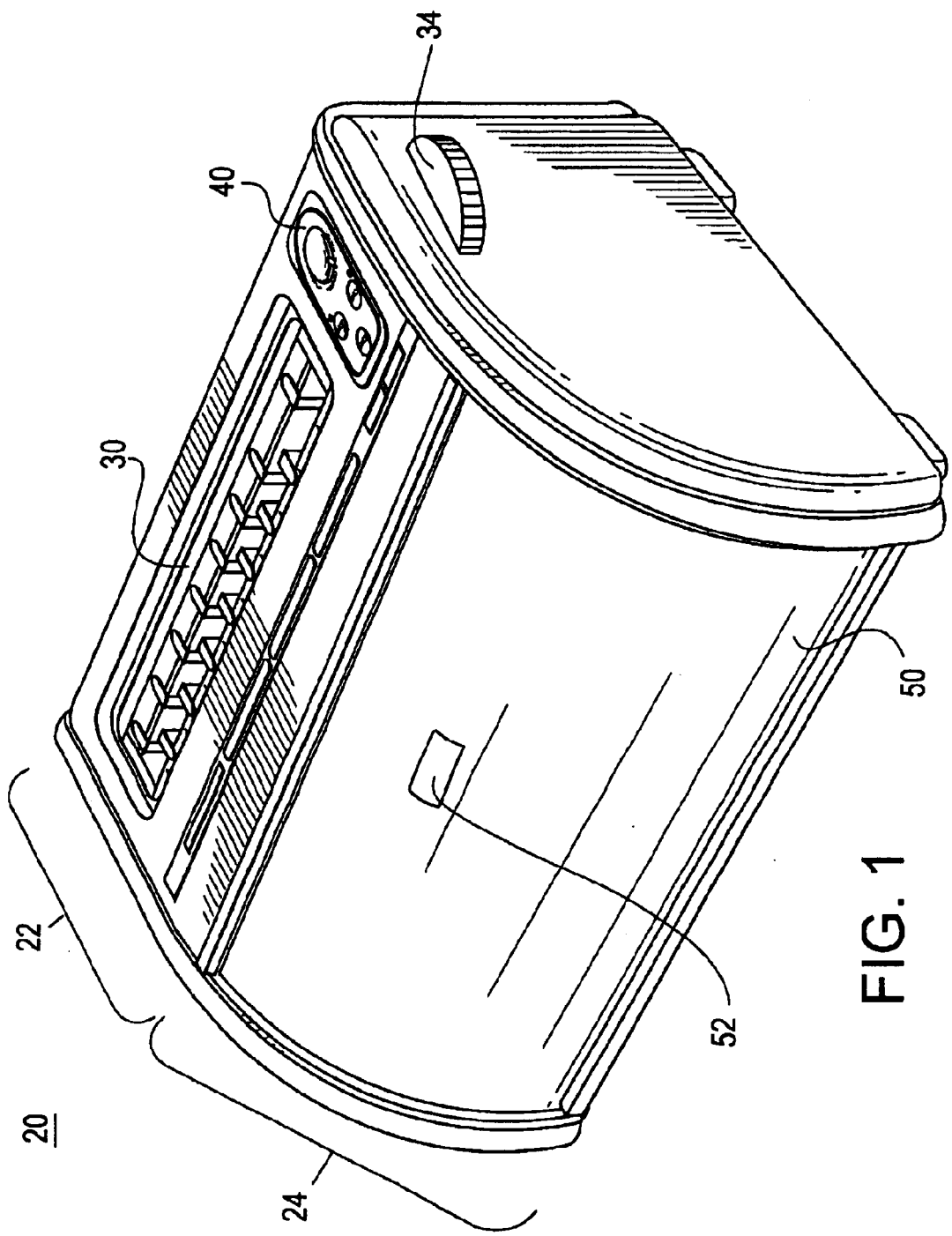
FIG. 1 is a front, perspective view of the combined toaster/breadbox of the present invention.

Referring now to the drawings, FIGS. 1–8 show various views of the combined toaster/breadbox of the present invention. The combined toaster/breadbox 20 (or, simply toaster breadbox) in accordance with the present invention includes a toaster section 22 and a breadbox section 24, both contained within a single enclosure.

Figure 10:
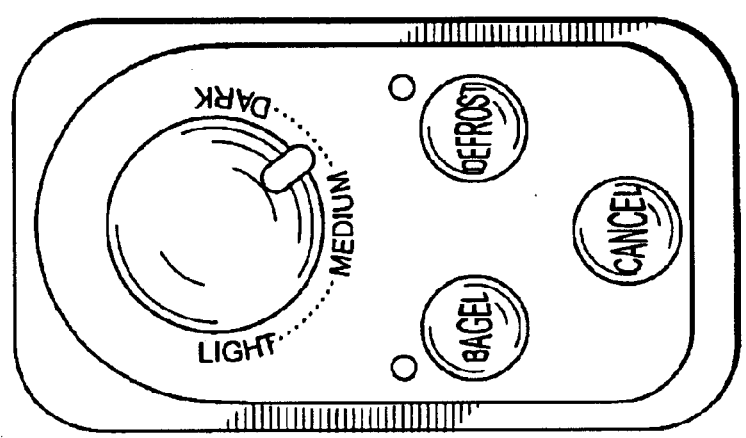
FIG. 10 is an exemplary control panel of the combined toaster/breadbox of the present invention.

Toaster section 22 includes various elements and components that are typical within prior art toasters, including a heating area 30 disposed within the toaster section and which includes an open top through which bread, a sliced bagel or other suitable food product may be placed. A plural number of heating elements 32 are disposed within heating area 30 of the toaster section and function to heat and/or toast the inserted food product upon lowering of the toaster's handle 34. The toaster section further includes a control panel 40, such as shown in FIG. 10. The control panel 40 includes a number of knobs and/or buttons to control the heating/toasting capability of the toaster section of the present invention. The toaster section 22 includes other electrical components and devices (not shown) necessary to perform its function and since the design and operation of such features are well known in the art, further description thereof is not provided herein.

Figure 2:
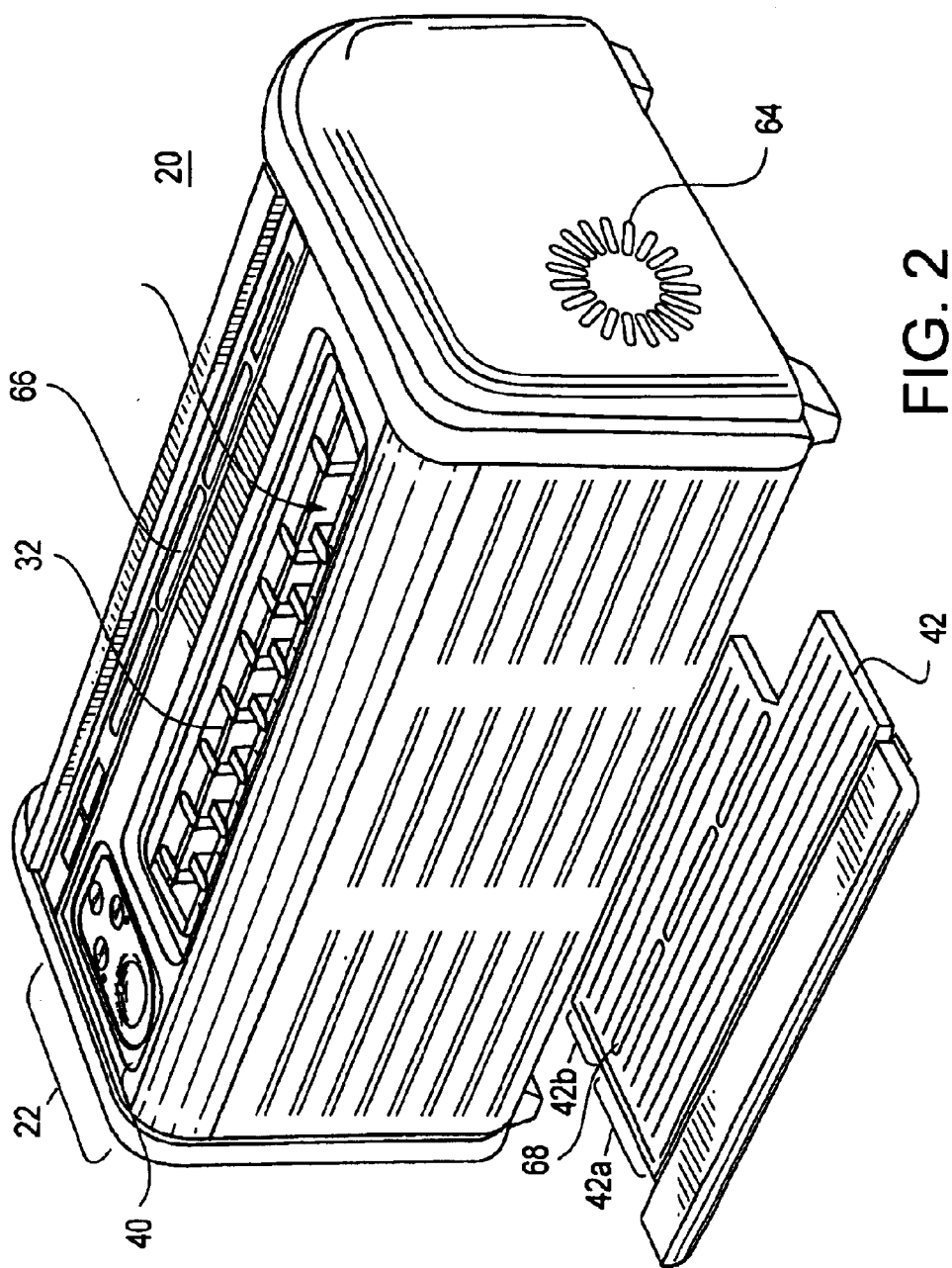
FIG. 2 is a rear, perspective view of the combined toaster/breadbox of the present invention.
Figure 3:
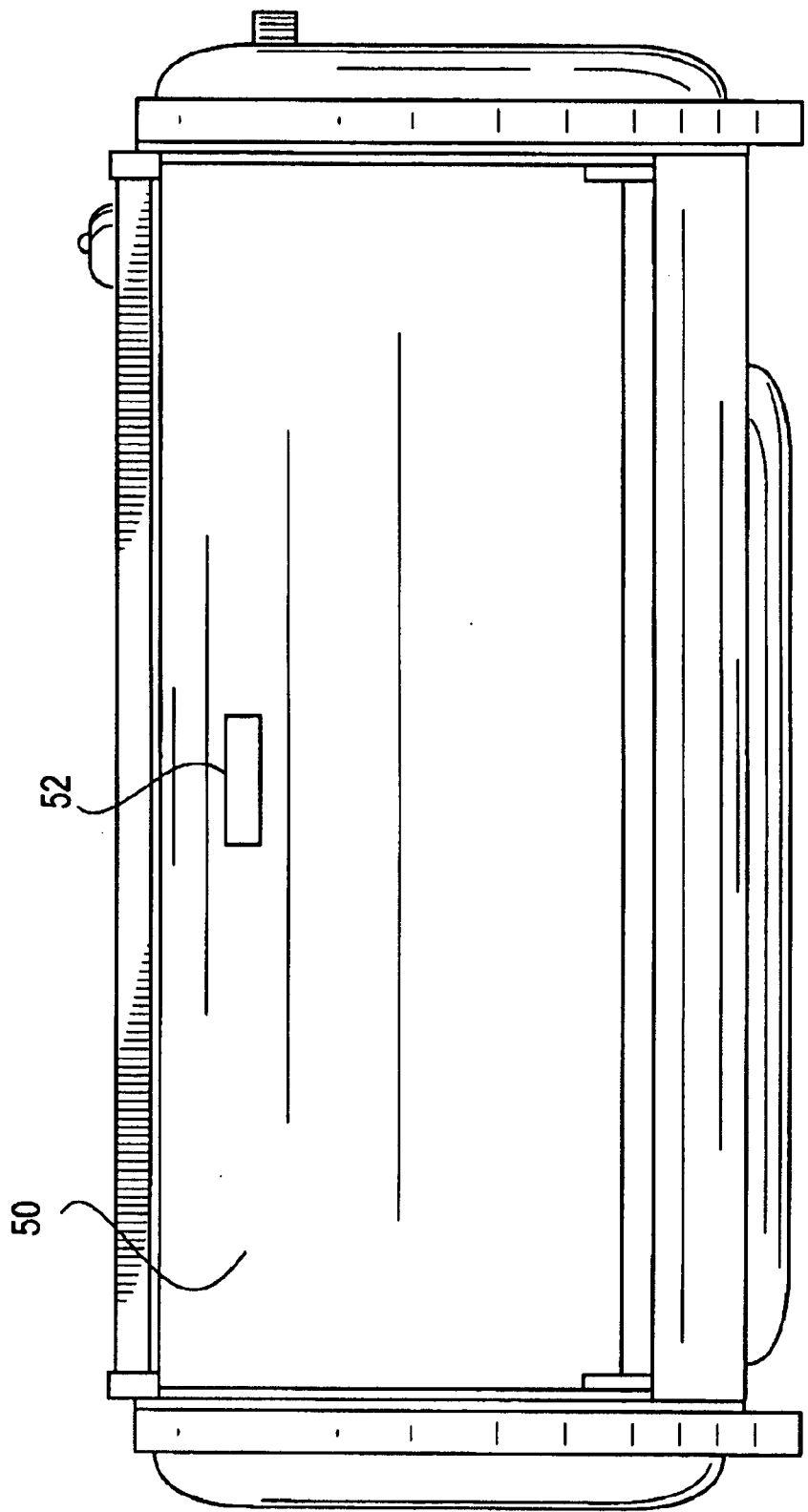
FIG. 3 is a front view of the combined toaster/breadbox of the present invention.
Figure 4:
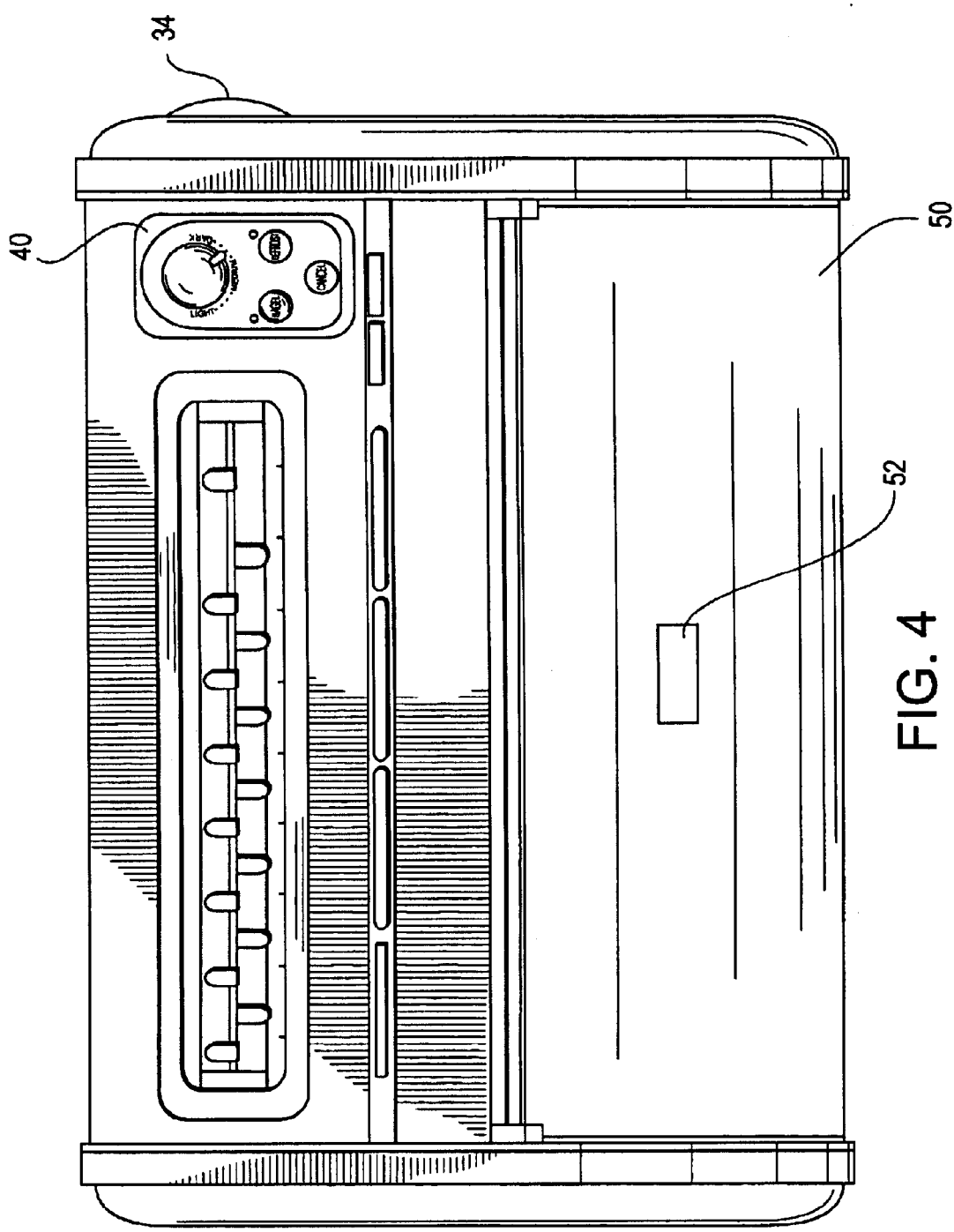
FIG. 4 is a top view of the combined toaster/breadbox of the present invention.
Figure 5:
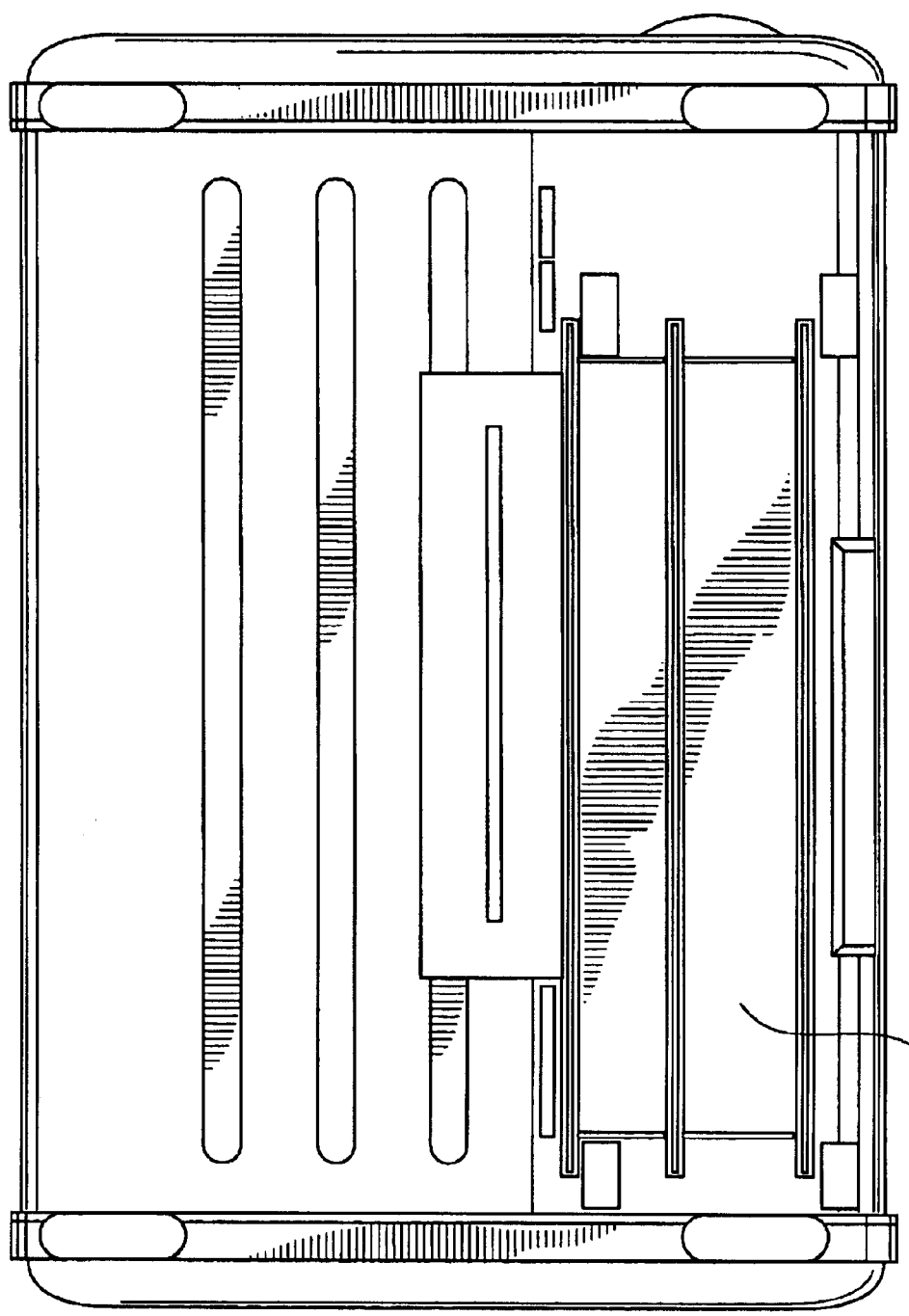
FIG. 5 is a bottom view of the combined toaster/breadbox of the present invention.
Figure 6:
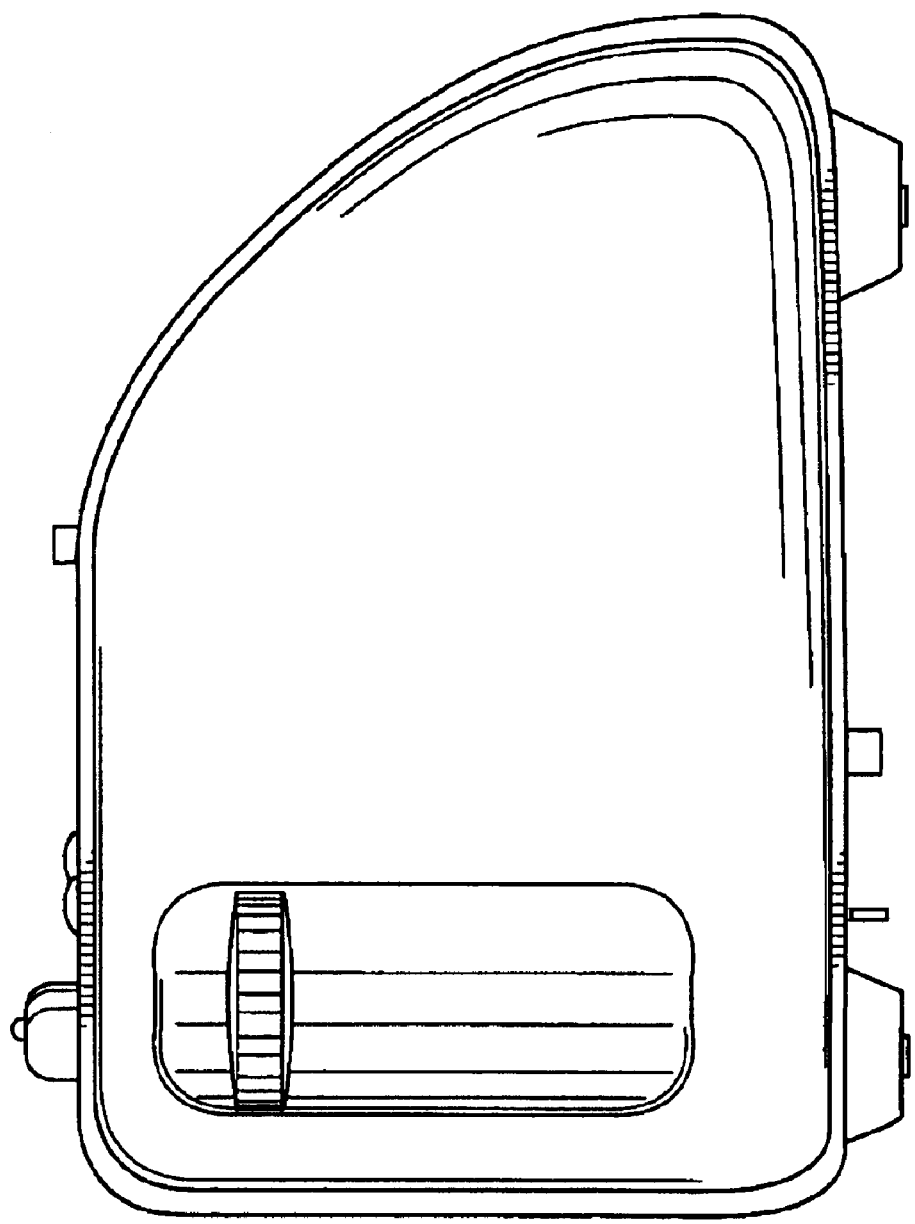
FIG. 6 is a right side view of the combined toaster/breadbox of the present invention.
Figure 7:
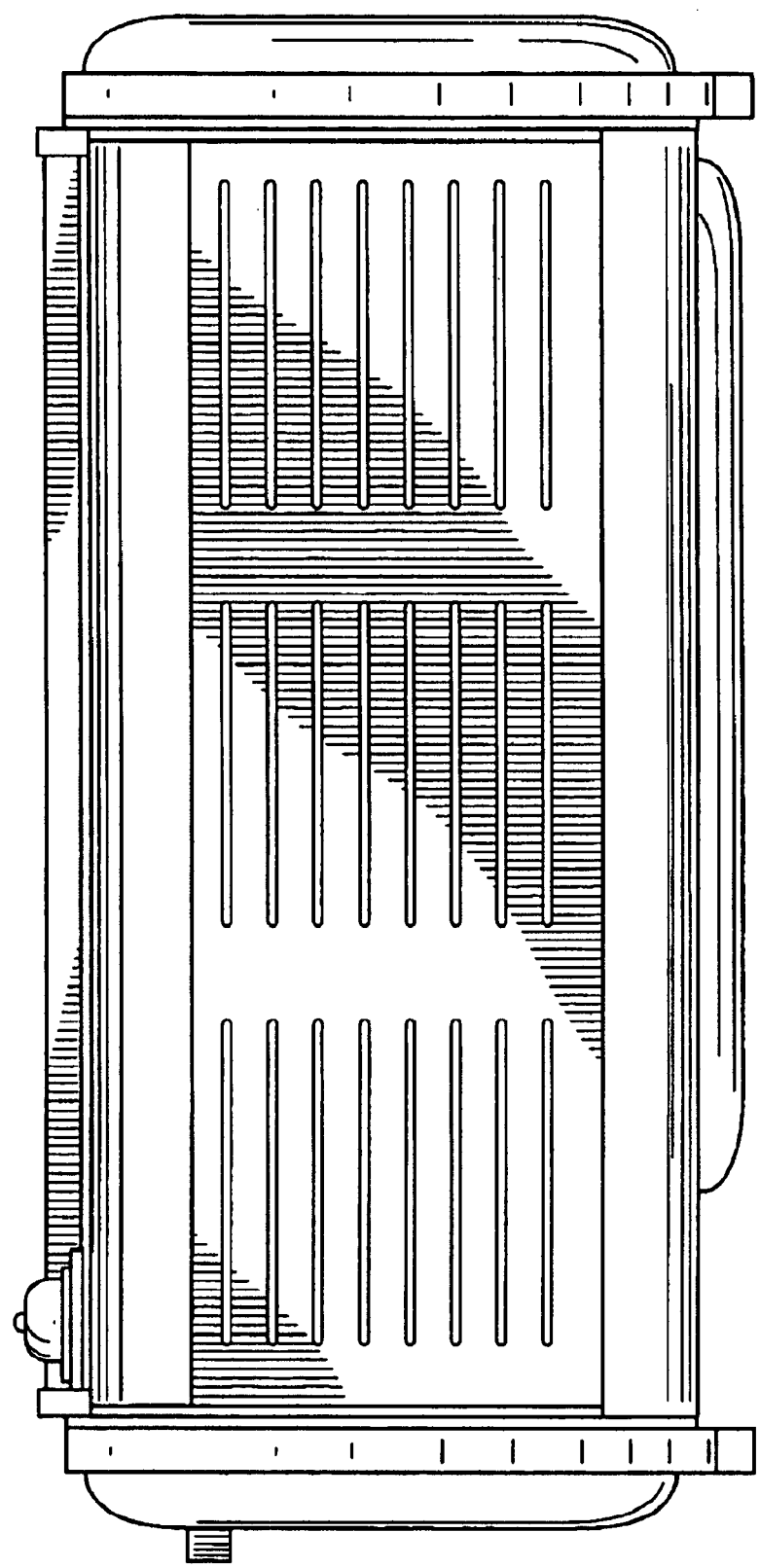
FIG. 7 is a rear view of the combined toaster/breadbox of the present invention.
Figure 8:
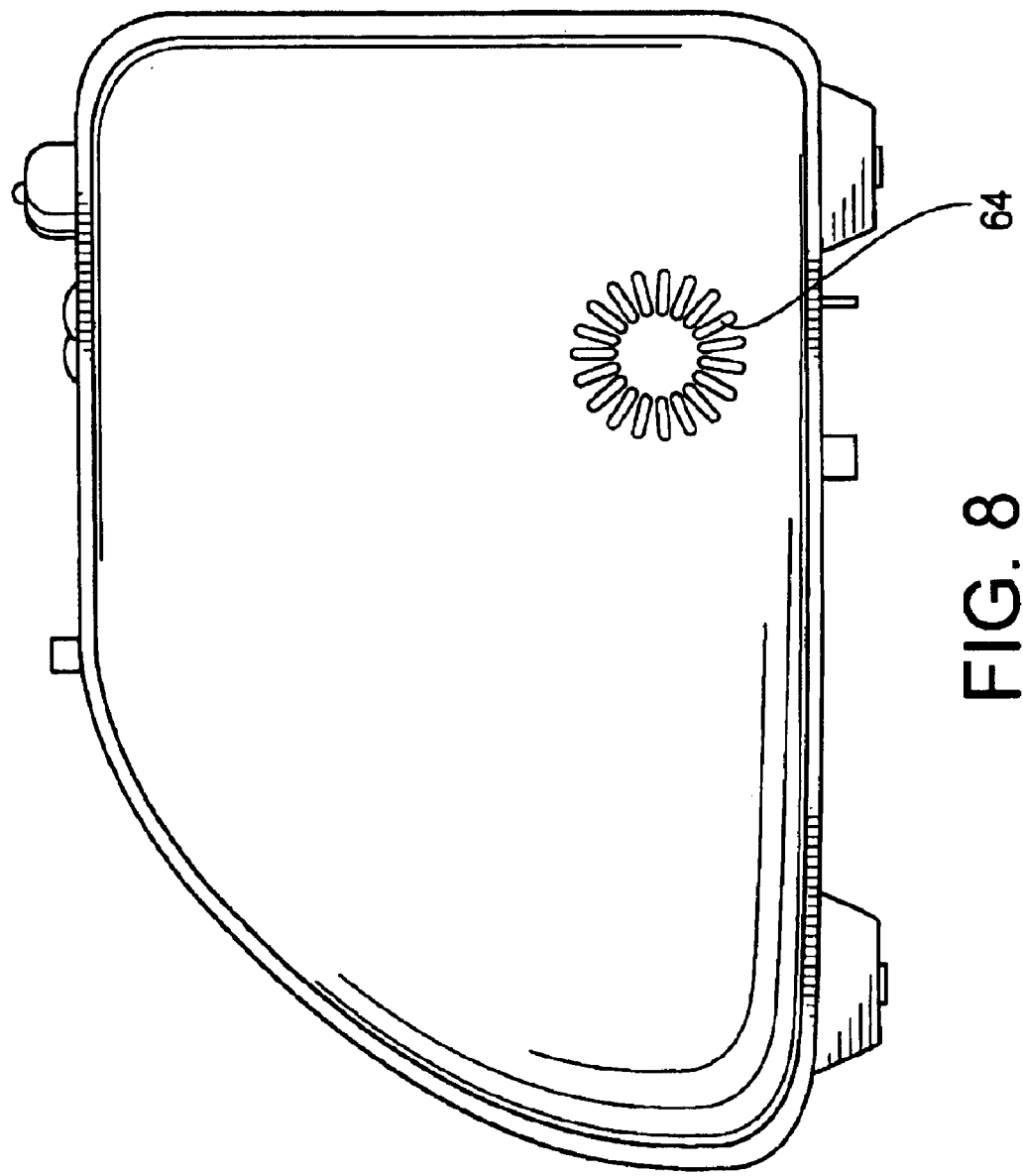
FIG. 8 is a left side view of the combined toaster/breadbox of the present invention.

As shown in FIG. 2, the toaster breadbox 20 includes a tray 42, disposed immediately below toaster section 22, for the purpose of catching and easy disposing of crumbs and other food particles that fall from the items being heated/toasted. Tray 42 is installed and removed from toaster section 22 in a typical manner. Tray 42 is further discussed below.

Figure 9:
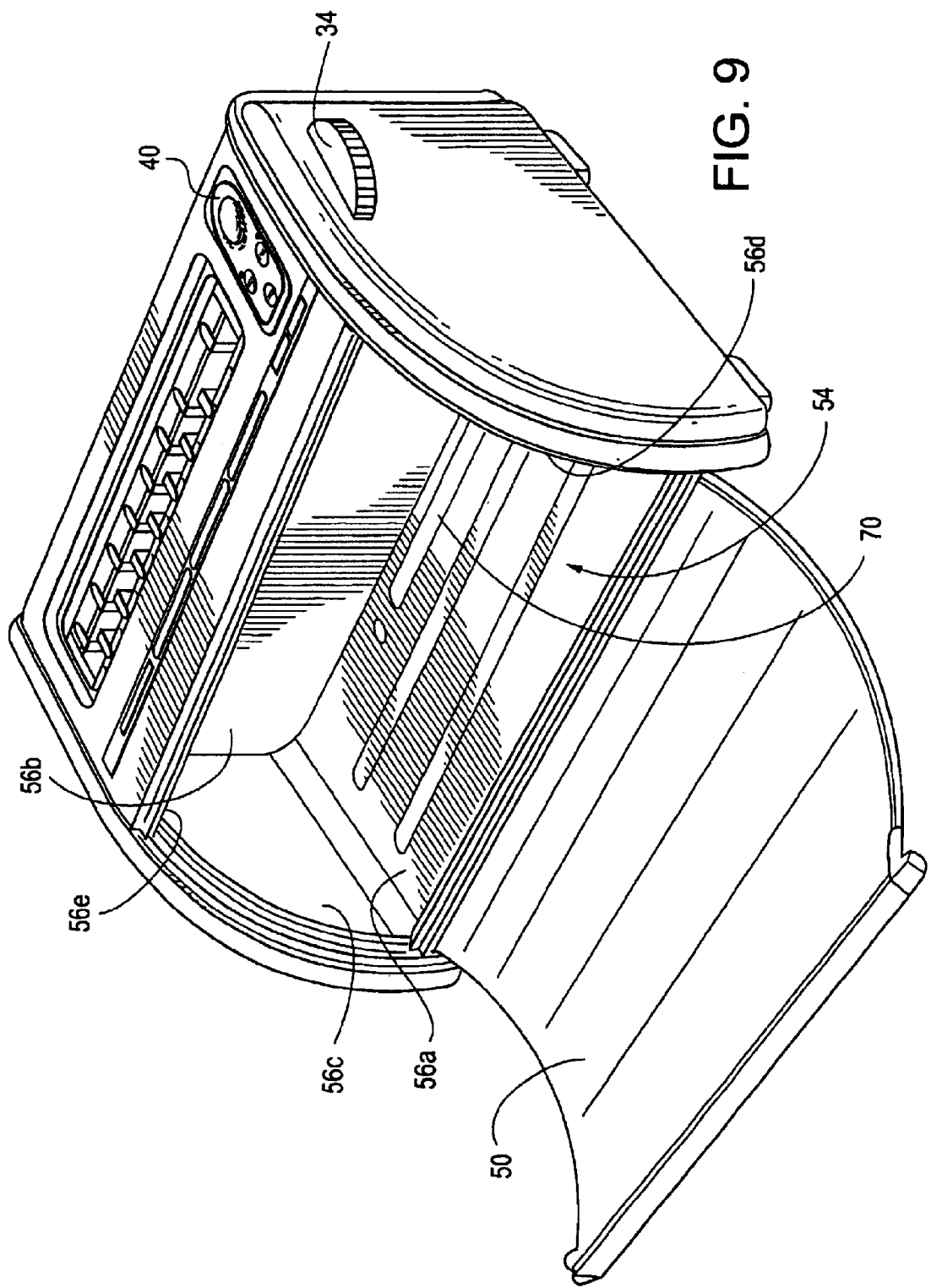
FIG. 9 is another front, perspective view of the combined toaster/breadbox shown with the breadbox compartment door in the open position.

The breadbox section 24 of the toaster breadbox 20 of the present invention includes a door 50 and a handle 52 disposed on the door so that the breadbox may be easily opened. FIG. 9 illustrates the toaster breadbox 20 with the breadbox door 50 in the open position. When door 50 is in the open position, the breadbox section reveals a compartment 54 in which bread and other food products may be stored. As best shown in FIG. 9, breadbox compartment 54 is enclosed by a floor 56a, a rear wall 56b, two side walls 56c and 56d, a ceiling 56e and door 50. As is clear from FIG. 9, door 50 is coupled to breadbox section 24 in a manner which allows the door to pivot between the open position shown in FIG. 9 and the closed position shown in FIG. 1. The design of such a connection is well known in the art. Also, the shape of door 50 may be such so as to omit ceiling 56e. Such particular design is not considered pertinent to the present invention.

Figure 11:
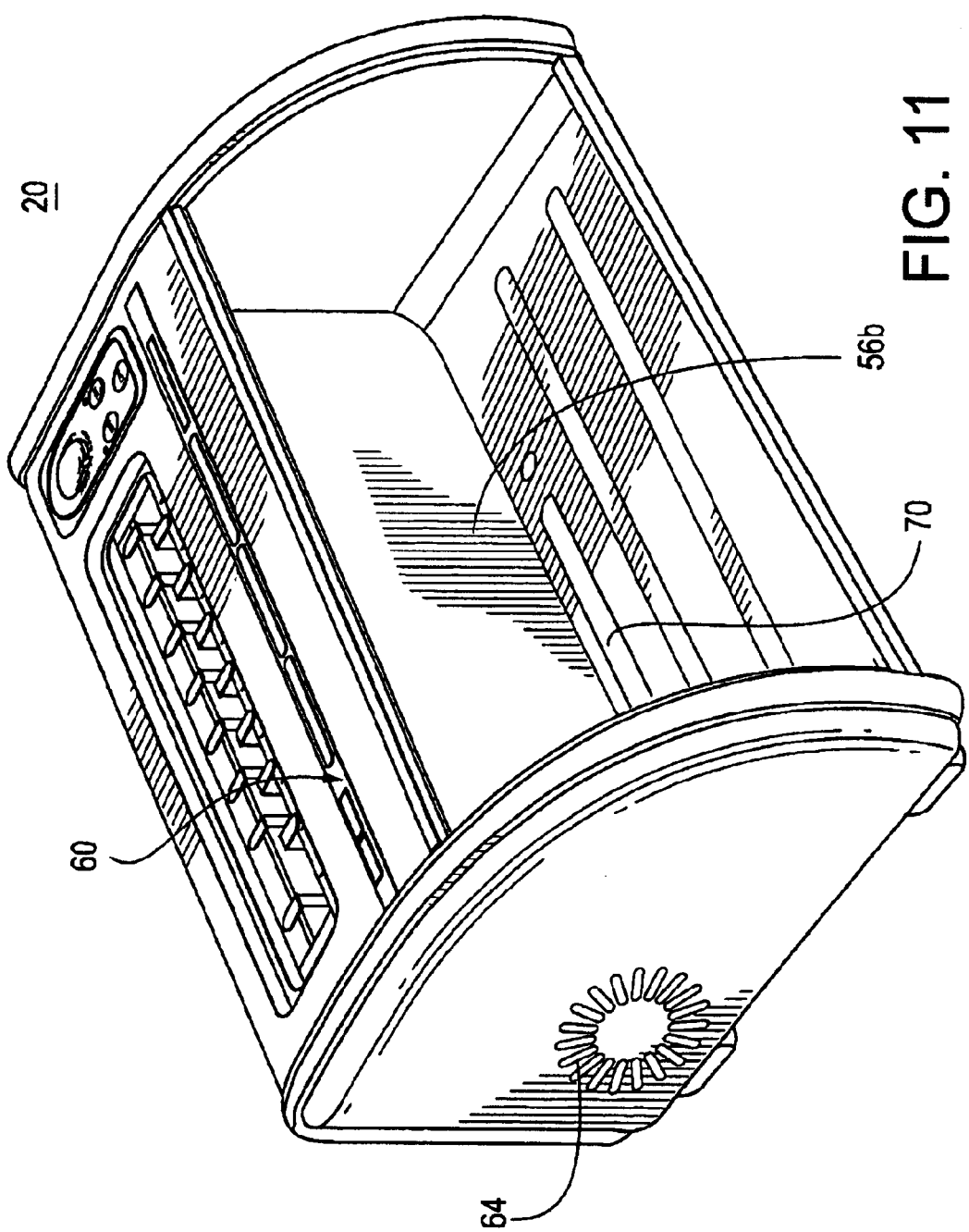
FIG. 11 is another front, perspective view of the toaster breadbox of the present invention shown without the breadbox door.
Figure 12:
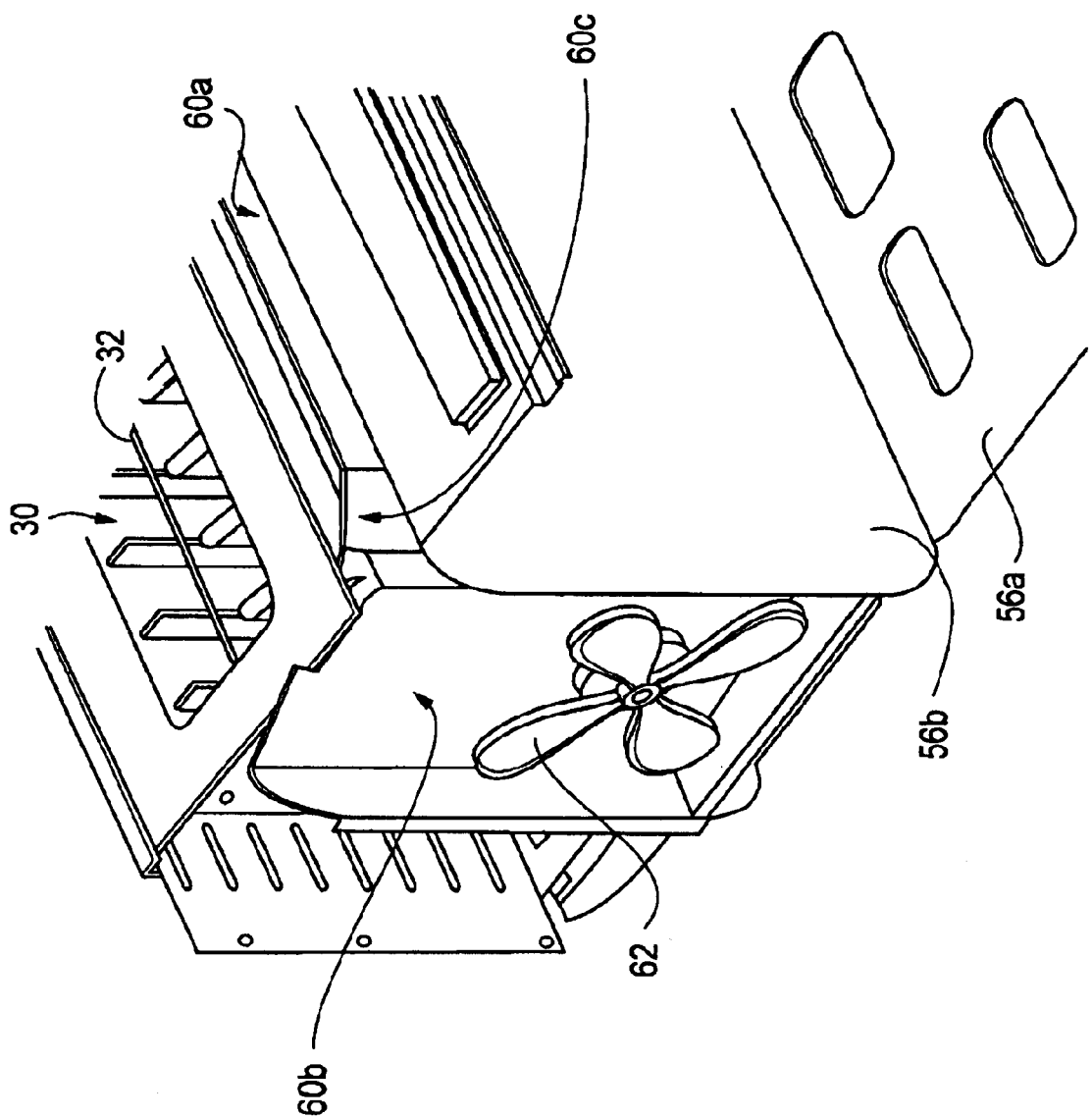
FIG. 12 is a perspective, partially cut-out view of the toaster breadbox showing the toaster breadbox's fan.
Figure 13:
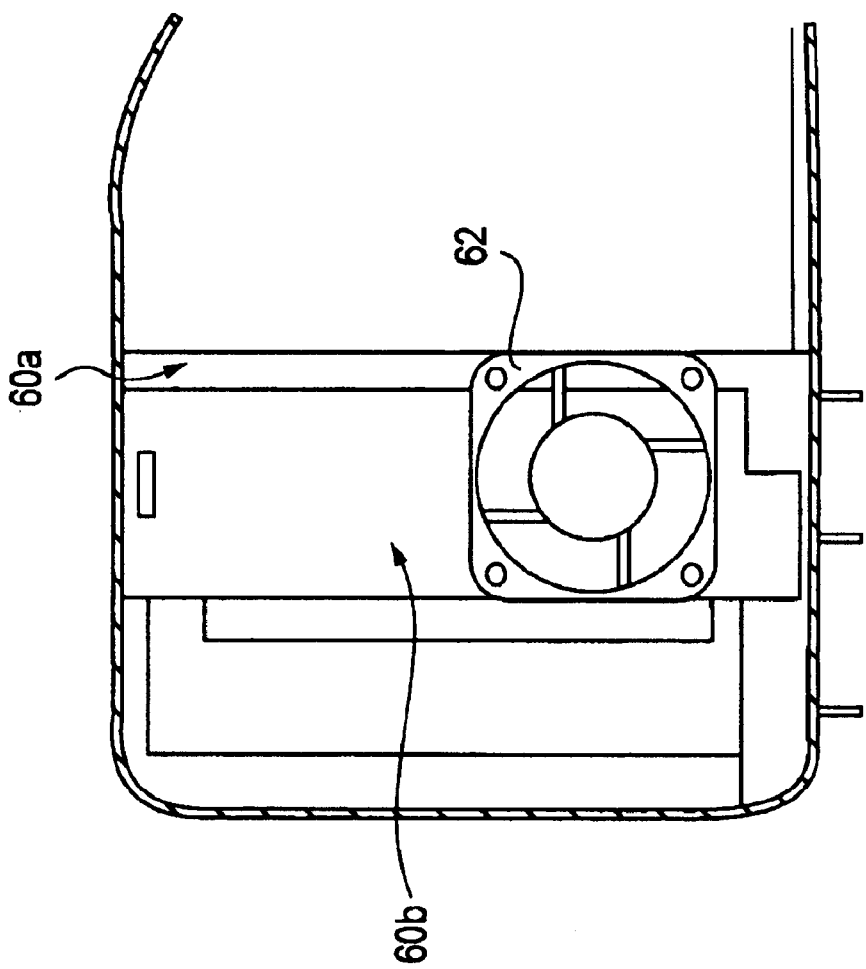
FIG. 13 is another side view of the toaster breadbox shown without the side walls.

Referring now to FIGS. 11–14 of the drawings, various additional novel features of the toaster breadbox 20 are illustrated. FIG. 11 illustrates toaster breadbox 20 shown without breadbox door 50, and illustrates the rear wall 56b of the breadbox compartment adjacent to a space 60 (or opening, or separation) that is provided between toaster section 22 and breadbox section 24. Space 60 extends the entire width of the combined toaster breadbox 20, as shown in FIG. 11, and also extends the entire height of toaster breadbox 20 (i.e., from bottom to top), as somewhat shown in FIGS. 12 and 13. As shown in FIG. 12, space 60 includes a narrow portion 60a and a wide portion 60b. Narrow portion 60a extends the entire width of the toaster section 22 heating area and wide portion 60b is disposed at one end of the toaster breadbox immediately adjacent the end of toaster section 22, as shown in FIG. 12. A fan 62 is disposed within the lower end of wide portion 60b. As further disclosed below, fan 62 functions to draw cool air into the unit forcing warm air disposed within space 60 out of the unit through various vents. FIG. 11 shows a set of air vents 64 stamped out of one of the sidewalls, which set of vents allows cool air to be drawn into the unit by fan 62. Heated air within the unit is forced from space 60 through a venting slot 66 disposed along the entire length of the top surface of the toaster breadbox 20 as shown in FIG. 2. An additional venting slot may be provided along the bottom of the toaster breadbox (to be further discussed) and an additional set of vents may be disposed on the other side of the toaster breadbox 20.

Figure 14:
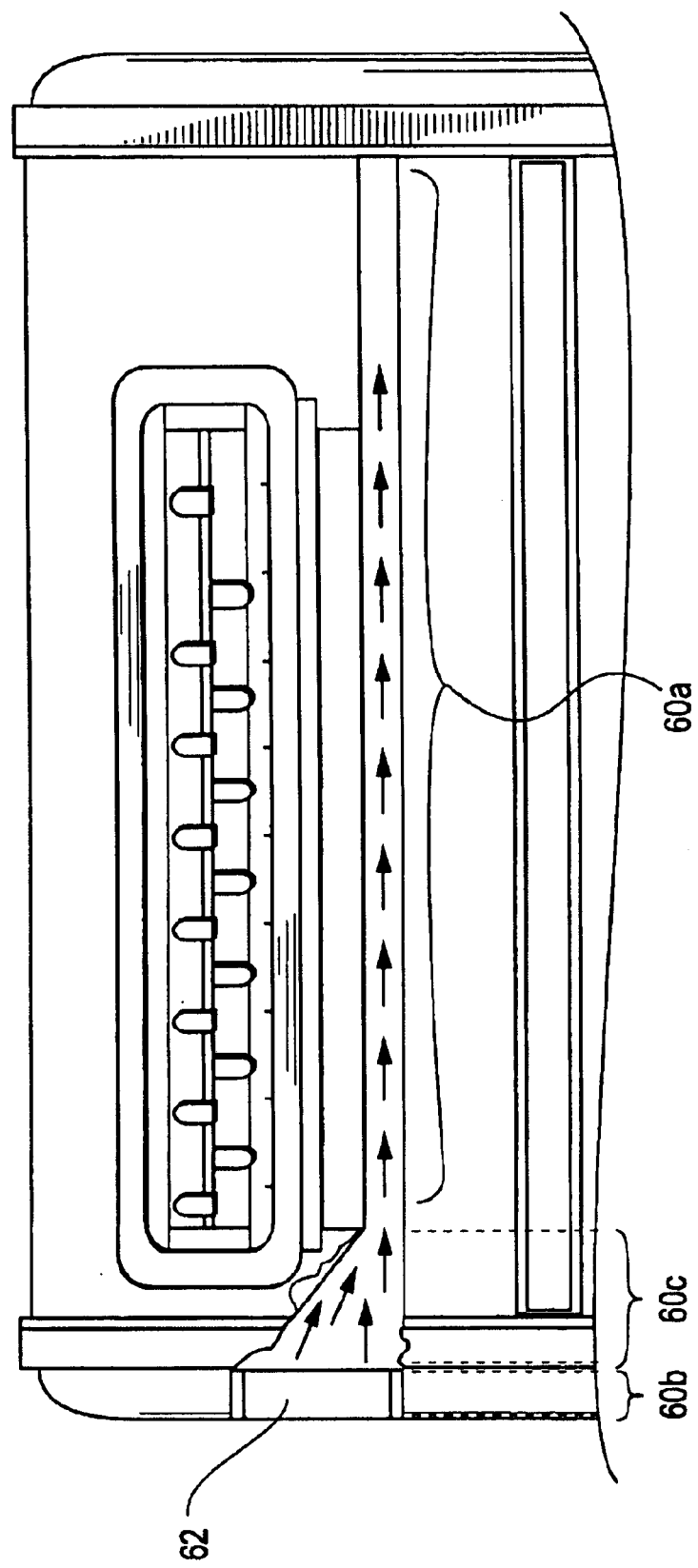
FIG. 14 is a top view showing the flow of air through a space disposed within the toaster breadbox in accordance with the present invention.
Figure 17:
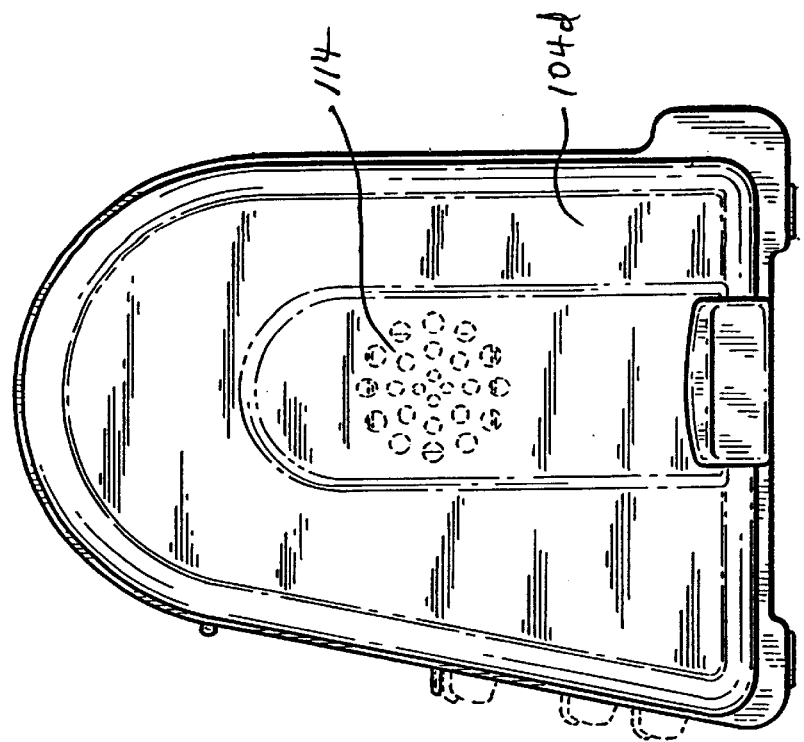
FIG. 17 is a right side view of the combined toaster oven breadbox of the present invention.
Figure 16:
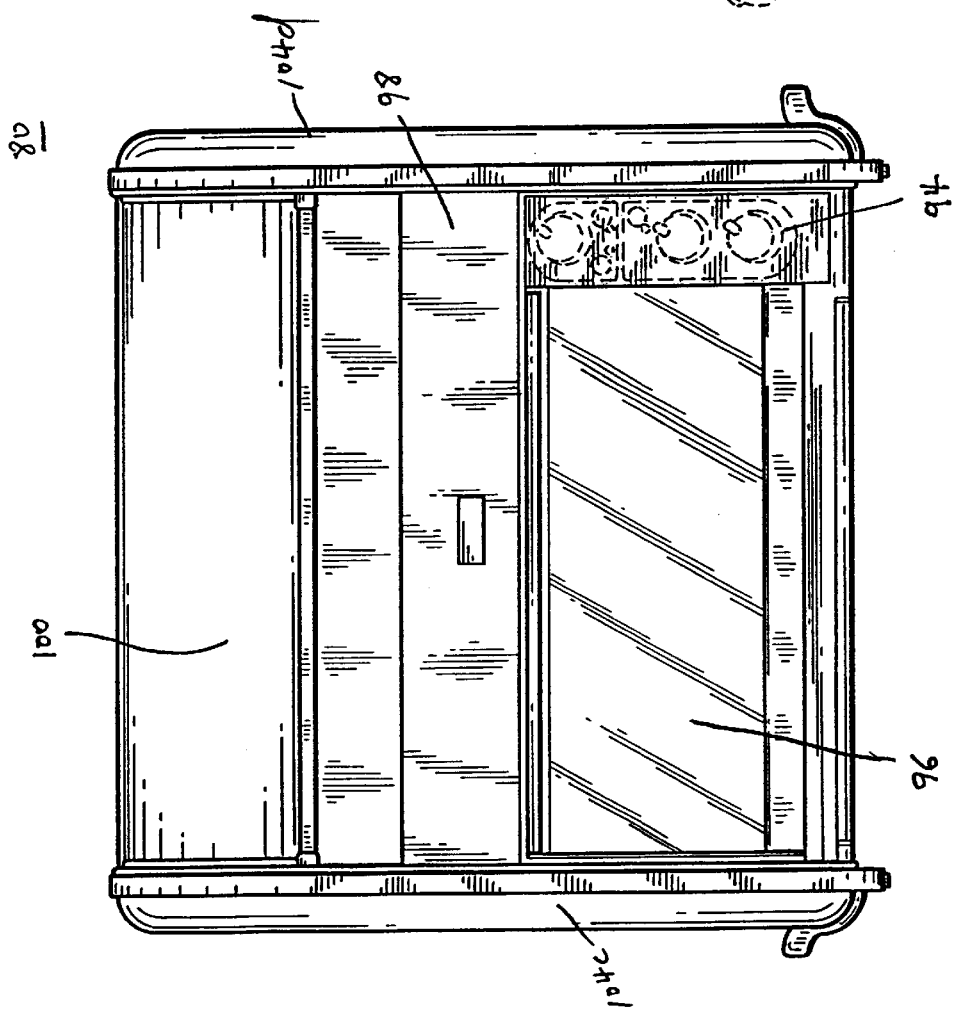
FIG. 16 is a front view of the combined toaster oven breadbox of the present invention.
Figure 20:
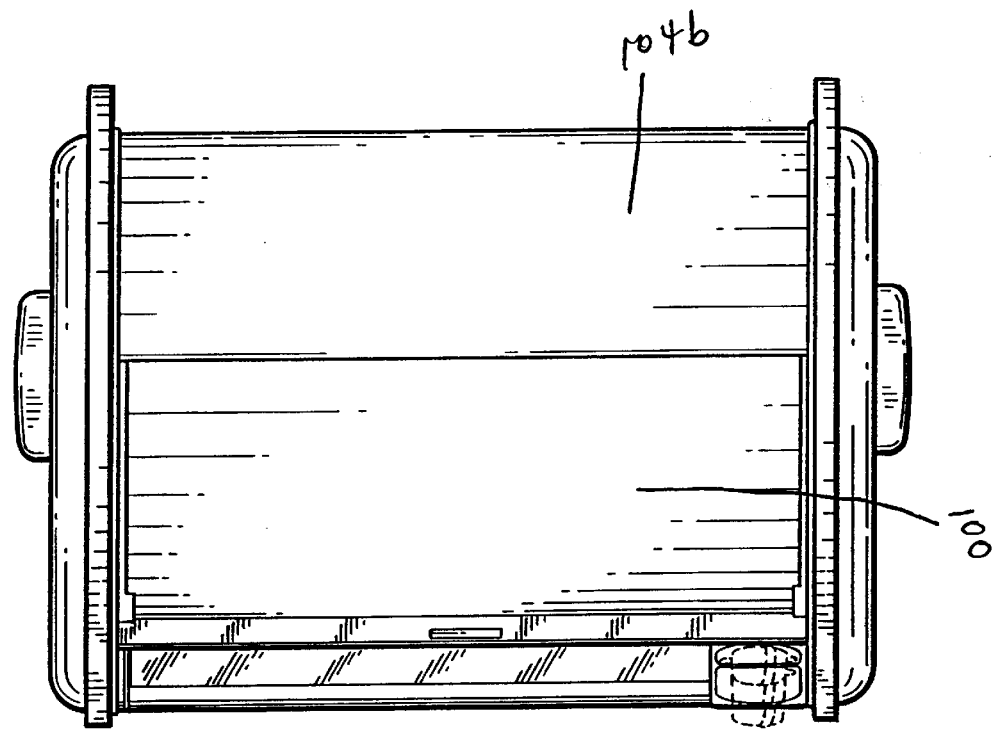
FIG. 20 is a top view of the combined toaster oven breadbox of the present invention.
Figure 21:
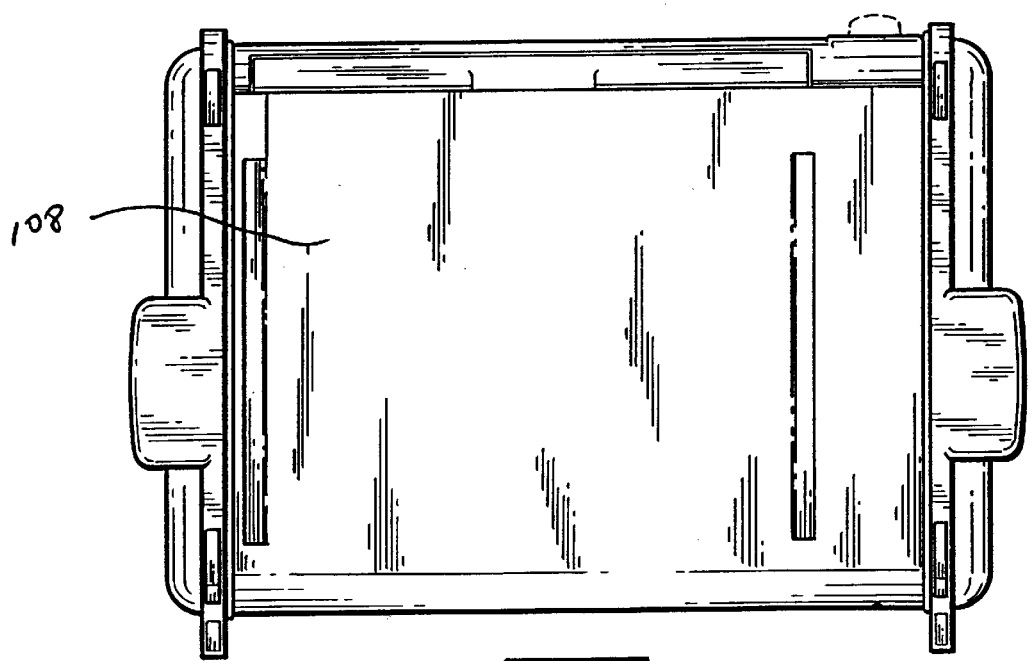
FIG. 21 is a bottom side view of the combined toaster oven breadbox of the present invention.

To further improve air circulation through the device between narrow portion 60a and wide portion 60b of space 60, a portion 60c is provided that decreases in width to produce a somewhat funnel effect to ensure that the cool air drawn by the fan travels along the entire length of space 60 as shown in FIG. 14 of the drawings. FIG. 14 also shows the direction of air flow through space 60.

In accordance with the present invention, toaster breadbox 20 is designed so that fan 62 is controlled to turn on upon depression of toaster handle 34 so that cool air is drawn through space 60 the entire time heating elements 32 are powered. This, in turn, maintains a relatively cool temperature within space 60 and thus the temperature within breadbox compartment 54 likewise is maintained relatively cool. Further, the operation of fan 62 is controlled to remain on for several seconds after the toasting operation is complete, thus continuing the flow of cool air through space 60 while heating elements 32 cool off. Although not shown, a thermostat may be provided that keeps fan 62 on until after the temperature within space 60 falls below a predetermined temperature level. Thus, in cases where heating elements 32 cool down quickly, fan 62 operates for a shorter duration as compared to cases where heating elements 32 remain hot for longer, extended periods of time. No matter the case, the combination of fan 62 and space 60 provided between toaster section 22 and breadbox section 24 allows for a toaster and a breadbox to be provided within a single enclosure as herein provided. Moreover, space 60 is designed structurally so that minimal additional space is needed to separate the toaster and breadbox sections, by the inclusion of a narrow portion 60a that extends the entire width of the unit with a wide portion 60b to allow for the use of a fan 62 disposed therein so that a large amount of air may be drawn through the device. Still further, the funnel-like design of space portion 60c (that decreases in width), as shown in both FIGS. 12 and 14, further maximizes air flow along the entire length of space 60 to provide the novel cooling action of the present invention.

In addition to the cooling action caused by fan 62 and space 60, breadbox compartment 54 is further insulated from the heat produced by heating elements 32 by the inclusion of thermo-insulating material within rear wall 56b of the breadbox compartment (or the entire wall may be made out of a thermo-insulating material), as well as the inclusion of thermo-insulators within other locations that may cause a transfer of heat from toaster section 22 to breadbox section 24.

Referring back to FIG. 2, tray 42 is provided to capture crumbs and other food particles that fall from within toaster section 22, as previously mentioned. In accordance with the present invention, tray 42 includes a tray portion 42a and a tray portion 42b that, when tray 42 is properly inserted and installed within toaster breadbox 20, operate to capture crumbs that fall within both toaster section 22 and the breadbox compartment 54. Specifically, tray section 42a is disposed immediately below toaster section 22 and operates like a typical crumb tray. Tray section 42b is disposed below an aperture 70 within the breadbox floor 56a (shown in FIGS. 9 and 11). As crumbs and other tiny food particles accumulate within breadbox compartment 54, such small particles may be easily disposed by pushing those particles into aperture 70 and then such particles are captured by a slot within tray section 42b. Then, when tray 42 is manually removed, all crumbs and food particles that have fallen within toaster section 22 and also those food particles that have been pushed into aperture 70 (or naturally fallen within aperture 70) may be easily disposed of.

Referring still to tray 42 shown in FIG. 2, the tray further is provided with a set of slots 68 that extend along its length. Such slots allow for heated air within space 60 to be vented out from the underside of toaster breadbox 20. Slots 68 further provide to thermo-insulate tray portions 42a and 42b from one another so that heat applied to tray portion 42a (originating from heating elements 32) is not transferred to tray portion 42b. Thus, a single crumb tray 42 may be provided for both the toaster and breadbox sections without causing the transfer of heat from the toaster section to the breadbox compartment.

FIGS. 15–27 illustrate another embodiment of the present invention. Referring to FIGS. 15–21, there are illustrated various views of a combined toaster oven breadbox in accordance with the present invention. Similar to the previously discussed embodiment, the combined toaster oven breadbox 80 includes a toaster oven section 82 and a bread box section 84. Toaster oven section 82 includes a heating area 90, heating elements 92, a control panel 94 and a toaster oven door 96. The combined device includes a narrow front panel 98 that physically separates the toaster oven and breadbox sections. Breadbox section 84 includes a breadbox door 100 with a handle 102 for lifting breadbox door 100 in the manner to be discussed. Breadbox compartment 104 is defined by the breadbox floor 104a, breadbox rear wall 104b (see FIG. 22A), side walls 104c and 104d and breadbox door 100. As shown in the exploded view shown in FIG. 22A, the toaster oven breadbox includes an enclosure with side walls 104c and 104d and a bottom panel 108.

Figure 22B:
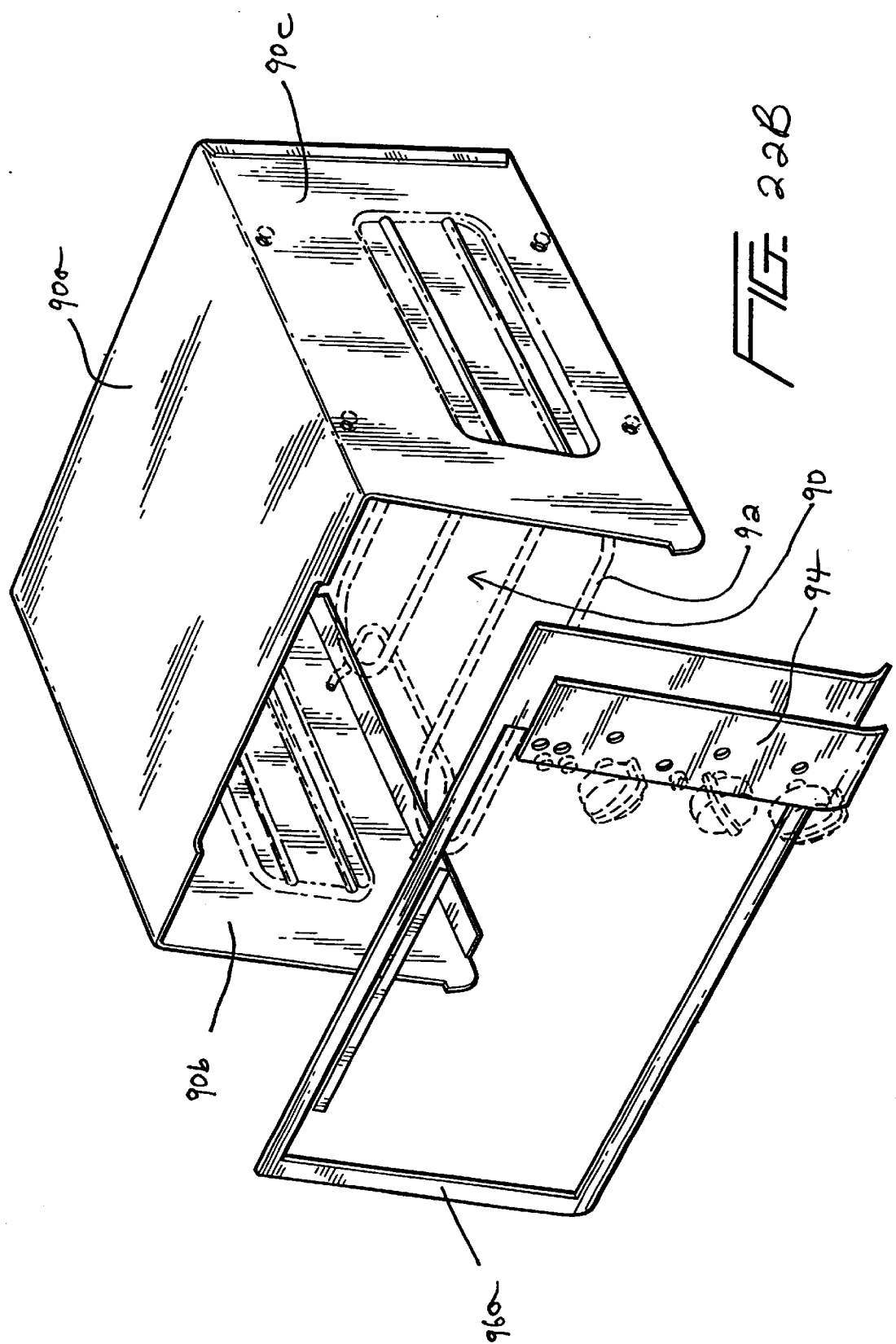
FIG. 22B is an exploded, perspective view of the toaster oven component of the combined toaster oven breadbox of the present invention.

Toaster oven section 82 is shown in FIG. 22b. The toaster oven includes the previously mentioned control panel 94 and a front panel 96a in which the toaster oven door 96 is installed. Heating area 90 is defined by the toaster oven ceiling 90a, side walls 90b and 90c, bottom panel 108 (see FIG. 22a) and rear panel 109 (also shown in FIG. 22a). Toaster oven section 82 is installed within the combined enclosure shown in FIG. 22a in any manner typical in the art. Referring next to FIG. 23, an exploded view of breadbox door 100 is illustrated. As shown, the breadbox door includes curved panel 100a having door handle 102, and side components 100b and 100c that enable for the lifting of the breadbox door within the enclosure shown in FIG. 22a by utilization of attachment devices 108. It is provided that the specific design of the breadbox door of the present invention as shown in the drawings is for illustrative purposes only and any typical doors used in breadboxes may be provided within the invention.

Referring next to FIGS. 24–26, there are shown various views of the combined toaster oven breadbox of the present invention, which illustrate the novel internal construction of the present invention. As previously discussed, floor 104a, which extends from small front panel 98 (see FIG. 22a), defines the lower surface of the breadbox compartment. Also, ceiling 90a (see FIG. 22b) defines the top surface of the toaster section. These surfaces are separated from one another in the manner shown in FIG. 25. Specifically, a divider panel 120 extends within the entire gap between the toaster oven and breadbox sections to define an upper space 110a above divider panel 120 and a lower space 110b below divider panel 120. Thus, upper space 110a spans nearly the entire width of the combined toaster oven breadbox and extends from the breadbox floor 104a to divider panel 120, and lower space 110b spans nearly the entire width of the combined toaster oven breadbox and extends from divider panel 120 down to ceiling 90a of the toaster oven section.

Still referring to FIG. 25, divider panel 120 extends from left side wall 104c to a wide space portion 110c which is disposed near right side panel 104d. Upper and lower spaces 110a and 110b thus come together at wide space 110c, and a fan 112 is disposed within wide space 110c. A set of vents 114 are provided in left side panel 104d so that fan 112 draws in air from the outside during use of the toaster oven breadbox of the present invention. As also shown in FIG. 25 and in FIG. 18, left side panel 104c includes a set of upper vents 116a to allow the venting of heated air within upper space 110a, and side panel 104c includes a set of lower vents 116b to vent heated air from lower space 110b. Similarly, the breadbox rear wall 104b, shown in FIGS. 19, 22a and 26, includes a set of upper rear vents 118a and a set of lower rear vents 118b that also allow the venting of heated air disposed within upper and lower spaces 110a and 110b, respectively.

To direct the air drawn in by fan 112 through vents 114, an air director 122 having the shape shown in FIG. 27 is installed within wide space 110c and adjacent to fan 112. Air director 122 as shown in both FIGS. 24 and 26 directs the drawn in air to both upper and lower spaces 110a and 110b extending from the front to rear ends of the combined toaster oven breadbox. Support 124 shown in FIG. 27 supports both fan 112 and air director 122, but any suitable support may be provided.

In accordance with the present invention, the combined toaster oven breadbox includes various features and structural design that allows for the placement of a breadbox compartment adjacent to the heating area of the toaster oven. The inclusion of divider panel 120 separates the gap between the toaster oven and breadbox sections so that air heated as a result of the operation of heating elements 32 within the toaster oven is substantially contained within lower space 110b. The operation of fan 112 draws in cool air which forces the heated air within space 110b to exit the device through the lower vents within the side and rear of the panels of the combined toaster oven breadbox. Moreover, to further ensure that the breadbox section remains cool, fan 112 further forces air within upper space 110b to exit within respective vents also within the side and rear panels of the toaster oven breadbox. Thus, and similar to the first described embodiment of the present invention, the operation of fan 112 along with the spaces and dividers provided result in the maintaining of a relatively cool environment within the breadbox section. Then, the use of the toaster oven of the present invention does not result in any meaningful increase in temperature within the breadbox section. Fan 112 operates in a manner similar to that of fan 62 of the previously discussed embodiment. Namely, fan 112 may be controlled to operate when the toaster oven is being utilized and to turn off after a predetermined amount of time (e.g., 10 seconds) after discontinued use of the toaster oven. Alternatively, fan 112 may be controlled to remain on while the temperature within the upper and lower spaces 110a and 110b are above a predetermined temperature.

While the present invention has been particularly shown and described in conjunction with preferred embodiments thereof, it would be appreciated by those of ordinary skill in the art that various changes may be made without departing from the spirit and scope of the invention. For example, although specific structural designs for various panels and compartments have been provided, the present invention is not limited to such design and may include other shaped compartments and designs not disclosed herein. For instance, the particular dimensions, curvature and widths of the various components may be modified.

Therefore, it is intended that the appended claims be interpreted as including the embodiments described herein, the alternatives mentioned above, and all equivalents thereto.

What is claimed is:

1. A combination toaster and breadbox, comprising, an enclosure;
a toaster having a heating area and disposed within the enclosure, the toaster adopted to heat a food product disposed within the heating area; and
a breadbox having a storage area and disposed within the enclosure; the storage area adapted to store a food product therein,
wherein the enclosure includes front, rear and two side panels, the toaster being disposed adjacent to the rear panel of the enclosure, the breadbox being disposed adjacent to the front panel of the enclosure, and the breadbox including a door disposed within the front panel of the enclosure,
wherein the enclosure includes a gap disposed between the breadbox and the toaster, the gap extending fully between the two side panels of the enclosure.

2. The combination of claim 1, further comprising a fan disposed within the gap, the fan being adapted to draw in cool air from an exterior of the enclosure into the gap.

3. The combination of claim 2, wherein each of the side panels includes venting slots adapted to allow air to flow through the venting slots into and out from the gap within the enclosure.

4. The combination of claim 2, wherein the gap includes a relatively narrow portion extending from one of the two sides of the enclosure to substantially near the other side of the enclosure, an relatively wide portion disposed adjacent to said other side of the enclosure, the fan being disposed within the relatively wide portion of the gap.

5. The combination of claim 1, wherein the gap extends from a top of the enclosure to a bottom of the enclosure along substantially a length of the gap extending between the two side panels of the enclosure.

6. The combination of claim 5, further comprising a tray disposed at a bottom of the enclosure and below both the toaster and the breadbox, the tray being adapted to capture items that fall within both the toaster and the breadbox; the tray being removable from the enclosure to dispose of captures items.

7. The combination of claim 6, wherein the tray includes a slot disposed below the gap to allow air to pass through the slot out from the gap.

8. A combination toaster and breadbox, comprising:
an enclosure;
a toaster having a heating area and disposed within the enclosure; the toaster adapted to heat a food product disposed within the heating area; and
a breadbox having a storage area and disposed within the enclosure; the storage area is adapted to store a food product therein,
wherein the enclosure includes first and second side panels; the breadbox extending fully between the first and second side panels; the toaster extending between the first panel to a position disposed away from the second panel the combination further comprising a gap disposed between the breadbox and the toaster and extending fully between the first and second panels; and a fan disposed within the gap and between the second panel and said position disposed away from the second panel; the fan adapted to draw cool air from an exterior of the enclosure into the gap.

9. A combination toaster and breadbox, comprising:
an enclosure;
a toaster having a heating area and dispose within the enclosure; the toaster adapted to heat a food product disposed within the heating area;
a breadbox having a storage area and disposed within the enclosure; the storage area is adapted to store a food product therein; and
a tray disposed at a bottom of the enclosure and below both the toaster and the breadbox, the tray being adapted to capture items that fall within both the toaster and the breadbox.

10. A combination toaster oven and breadbox, comprising:
an enclosure;
a toaster oven having a heating area and disposed within the enclosure; the toaster oven adapted to heat a food product disposed within the heating area; and
a breadbox having a storage area and disposed within the enclosure; the storage area adapted to store a food product therein.

11. The combination of claim 10, wherein the breadbox is disposed above the toaster oven within the enclosure; the enclosure including a gap between the toaster oven and breadbox adapted to reduce transfer of heat between the toaster oven and breadbox.

12. The combination of claim 11, further comprising a fan disposed within the gap and adapted to draw in cool air from an exterior of the enclosure into the gap.

13. The combination of 10, wherein the enclosure includes front, rear and two side panels, both the toaster oven and the breadbox extending between the front and rear panels.

14. The combination of claim 13, wherein the enclosure includes a gap disposed between the breadbox and the toaster oven, the gap extending between the two side panels of the enclosure.

15. The combination of claim 14, further comprising a fan disposed within the gap, the fan being adapted to draw in cool air from an exterior of the enclosure into the gap.

16. The combination of claim 14, wherein each of the side panels includes venting slots adapted to allow air to flow through the venting slots into and out from the gap within the enclosure.

17. The combination of claim 14, wherein the gap includes a relatively narrow portion extending from one of the two sides of the enclosure to substantially near the other side of the enclosure, and a relatively wide portion disposed adjacent to said other side of the enclosure, the fan being disposed within the relatively wide portion of the gap.

18. The combination of claim 14, wherein the gap extends between the front and rear panels of the enclosure along substantially a length of the gap extending between the two side panels of the enclosure.

19. The combination of claim 18, wherein the rear panel includes venting slots to allow a flow of air between the gap and an exterior of the enclosure.

20. The combination of claim 13, wherein the enclosure includes a divider panel disposed between the breadbox and the toaster oven, a space being disposed between the divider panel and the toaster oven to define a first gap and another space being disposed between the divider panel and the breadbox to define a second gap.

21. The combination of claim 20, wherein the divider panel extends from one side of the enclosure to a position disposed away from the other side of the enclosure; the combination including a fan disposed adjacent the divider panel between said other side and said position disposed away from the other side; the fan being adapted to draw cool air from an exterior of the enclosure into both the first and second gaps.

22. A combination toaster and breadbox, comprising:
an enclosure;
a heating area disposed within the enclosure and adapted to heat a food product disposed therein; and
a storage area disposed within the enclosure, the storage area adapted to store a food product therein,
wherein the enclosure includes front, rear and two side panels; the heating area disposed adjacent to the rear panel of the enclosure; the storage area disposed adjacent to the front panel of the enclosure; the storage area including a door disposed within the front panel of the enclosure.

23. The combination of claim 22, wherein the heating area extends between the first side panel to a position disposed away from the second side panel, and wherein the storage area extends fully between the first and second side panels.

24. The combination of claim 22, further comprising the heating area disposed away from the front panel of the enclosure comprising the storage area including the door; the heating area disposed above the storage area within the enclosure,
wherein the enclosure includes a gap disposed between the heating area and the storage area, the gap extending fully between the two side panels of the enclosure.

25. The combination of claim 24, further comprising a fan disposed within the gap, the fan being adapted to draw in cool air from an exterior of the enclosure into the gap.

26. The combination of claim 25, wherein the gap includes a relatively narrow portion extending from one of the two sides of the enclosure to substantially near the other side of the enclosure, and a relatively wide portion disposed adjacent to said other side of the enclosure, the fan being disposed within the relatively wide portion of the gap.

27. The combination of claim 24, wherein each of the side panels includes venting slots adapted to allow air to flow through the venting slots into and out from the gap within the enclosure.

28. The combination of claim 24, wherein the gap extends from the rear of the enclosure to the front of the enclosure along substantially a length of the gap extending between the two side panels of the enclosure.

29. The combination of claim 28, further comprising a tray disposed at a bottom of the enclosure and below both the heating area and the storage area, the tray being adapted to capture items that fall within both the heating area and the storage area; the tray being removable from the enclosure to dispose of captured items.

30. The combination of claim 29, wherein the tray includes a slot disposed below the gap to allow air to pass through the slot out from the gap.

31. The combination of claim 22, further comprising a tray disposed at a bottom of the enclosure and below both the heating area and storage area, the tray being adapted to capture items that fall within both the heating area and the storage area.

* * * * *